US009002313B2

(12) United States Patent
Sink et al.

(10) Patent No.: US 9,002,313 B2
(45) Date of Patent: Apr. 7, 2015

(54) FULLY INTEGRATED LIGHT BAR

(75) Inventors: Gregory A. Sink, Frankfort, IL (US);
Paul M. Gergets, Saint John, IN (US)

(73) Assignee: Federal Signal Corporation, Oak Brook, IL (US)

( * ) Notice: Subject to any disclaimer, the term of this patent is extended or adjusted under 35 U.S.C. 154(b) by 152 days.

(21) Appl. No.: 11/548,209

(22) Filed: Oct. 10, 2006

(65) Prior Publication Data
US 2007/0195939 A1 Aug. 23, 2007

Related U.S. Application Data

(63) Continuation-in-part of application No. 11/394,752, filed on Mar. 31, 2006, and a continuation-in-part of application No. 11/505,642, filed on Aug. 17, 2006.

(60) Provisional application No. 60/775,634, filed on Feb. 22, 2006.

(51) Int. Cl.
H04W 4/22 (2009.01)
H04M 11/04 (2006.01)
B60Q 1/26 (2006.01)
H04L 12/24 (2006.01)

(52) U.S. Cl.
CPC .............. B60Q 1/2611 (2013.01); H04L 12/24 (2013.01); H04L 41/00 (2013.01); H04L 41/22 (2013.01)

(58) Field of Classification Search
USPC ....................... 340/937, 933, 539.1, 541, 468; 455/524, 404.1; 379/37, 38; 370/338, 370/310; 701/36, 300
See application file for complete search history.

(56) References Cited

U.S. PATENT DOCUMENTS

| | | | |
|---|---|---|---|
| 4,155,042 | A | 5/1979 | Permut et al. |
| 4,633,229 | A | 12/1986 | Iacono et al. |
| 4,722,030 | A | 1/1988 | Bowden |
| 4,789,904 | A | 12/1988 | Peterson |

(Continued)

FOREIGN PATENT DOCUMENTS

| | | |
|---|---|---|
| BE | 1006768 A6 | 12/1994 |
| CA | 2426243 A1 | 10/2003 |

(Continued)

OTHER PUBLICATIONS

"WLAN Solutions: TNETW1100B Embedded Single-Chip MAC and Baseband Processor" Texas Instruments Product Bulletin (© 2002).

(Continued)

*Primary Examiner* — Khawar Iqbal
(74) *Attorney, Agent, or Firm* — Leydig, Voit & Mayer, Ltd.

(57) ABSTRACT

An emergency system for a vehicle integrates many disparate equipment into single housing. In one embodiment of the invention, the emergency system is a light bar. The light bar houses various modules for monitoring and responding to events. Example modules include license plate recognition systems and chemical agent detection sensors. The light bar also houses at least one transceiver for wirelessly connecting the light bar to a wide area network, allowing the modules in the light bar to communicate data to and from a remote site. A data terminal in the vehicle is connected to the light bar and receives and displays data to the vehicle operate generated by the modules in the light bar and also from data received over the network.

23 Claims, 14 Drawing Sheets

(56) References Cited

U.S. PATENT DOCUMENTS

| | | | |
|---|---|---|---|
| 5,185,697 A | 2/1993 | Jacobs et al. | |
| 5,487,069 A | 1/1996 | O'Sullivan et al. | |
| 5,539,398 A | 7/1996 | Hall et al. | |
| 5,567,036 A | 10/1996 | Theobald et al. | |
| 5,572,201 A | 11/1996 | Graham et al. | |
| 5,602,739 A | 2/1997 | Haagenstad et al. | |
| 5,689,233 A | 11/1997 | Kurisu et al. | |
| 5,815,417 A | 9/1998 | Orr et al. | |
| 5,826,180 A | 10/1998 | Golan | |
| 5,861,959 A | 1/1999 | Barak | |
| 5,884,997 A | 3/1999 | Stanuch et al. | |
| 5,887,139 A | 3/1999 | Madison, Jr. et al. | |
| 5,926,113 A | 7/1999 | Jones et al. | |
| 5,931,573 A | 8/1999 | Knox | |
| 5,937,029 A | 8/1999 | Yosef | |
| 5,986,575 A | 11/1999 | Jones et al. | |
| 6,046,824 A | 4/2000 | Barak | |
| 6,081,191 A | 6/2000 | Green et al. | |
| 6,100,801 A | 8/2000 | Plummer | |
| 6,112,088 A | 8/2000 | Haartsen | |
| 6,149,288 A | 11/2000 | Huang | |
| 6,154,787 A | 11/2000 | Urevig et al. | |
| 6,161,066 A | 12/2000 | Wright et al. | |
| 6,167,036 A | 12/2000 | Beven | |
| 6,169,476 B1 | 1/2001 | Flanagan | |
| 6,188,939 B1 | 2/2001 | Morgan et al. | |
| 6,192,232 B1 | 2/2001 | Iseyama | |
| 6,243,026 B1 | 6/2001 | Jones et al. | |
| 6,249,812 B1 | 6/2001 | Cromer et al. | |
| 6,330,025 B1 | 12/2001 | Arazi et al. | |
| 6,411,874 B2 | 6/2002 | Morgan et al. | |
| 6,437,692 B1 | 8/2002 | Petite et al. | |
| 6,474,557 B2 | 11/2002 | Mullins et al. | |
| 6,484,456 B1 * | 11/2002 | Featherstone et al. | 52/118 |
| 6,542,602 B1 | 4/2003 | Elazar | |
| 6,564,342 B2 | 5/2003 | Landan | |
| 6,566,842 B1 | 5/2003 | Kirkpatrick | |
| 6,567,747 B1 | 5/2003 | Lange et al. | |
| 6,574,561 B2 | 6/2003 | Alexander et al. | |
| 6,612,713 B1 | 9/2003 | Kuelbs | |
| 6,624,750 B1 | 9/2003 | Marman et al. | |
| 6,641,284 B2 | 11/2003 | Stopa et al. | |
| 6,747,557 B1 | 6/2004 | Petite et al. | |
| 6,762,686 B1 | 7/2004 | Tabe | |
| 6,778,078 B1 * | 8/2004 | Han et al. | 340/474 |
| 6,856,343 B2 | 2/2005 | Arazi et al. | |
| 6,868,340 B2 | 3/2005 | Alexander et al. | |
| 6,891,838 B1 | 5/2005 | Petite et al. | |
| 6,914,533 B2 | 7/2005 | Petite | |
| 6,930,596 B2 | 8/2005 | Kulecz et al. | |
| 6,942,360 B2 | 9/2005 | Chou et al. | |
| 6,959,079 B2 | 10/2005 | Elazar | |
| 6,966,682 B2 | 11/2005 | Frank et al. | |
| 6,976,769 B2 | 12/2005 | McCullough et al. | |
| 6,982,518 B2 | 1/2006 | Chou et al. | |
| 6,999,876 B2 | 2/2006 | Lambert et al. | |
| 7,010,106 B2 | 3/2006 | Gritzer et al. | |
| 7,010,109 B2 | 3/2006 | Gritzer et al. | |
| 7,015,806 B2 | 3/2006 | Naidoo et al. | |
| 7,016,478 B2 | 3/2006 | Potorny et al. | |
| 7,016,647 B2 | 3/2006 | Albert et al. | |
| 7,034,678 B2 | 4/2006 | Burkley et al. | |
| 7,044,616 B2 | 5/2006 | Shih | |
| 7,057,517 B1 | 6/2006 | Convery | |
| 7,058,710 B2 | 6/2006 | McCall et al. | |
| 7,065,445 B2 | 6/2006 | Thayer et al. | |
| 7,070,418 B1 | 7/2006 | Wang | |
| 7,080,544 B2 | 7/2006 | Stepanik et al. | |
| 7,091,852 B2 | 8/2006 | Mason et al. | |
| 7,095,334 B2 * | 8/2006 | Pederson | 340/815.45 |
| 7,103,511 B2 | 9/2006 | Petite | |
| 7,119,832 B2 * | 10/2006 | Blanco et al. | 348/148 |
| 7,148,803 B2 | 12/2006 | Bandy et al. | |
| 7,158,026 B2 | 1/2007 | Feldkamp et al. | |
| 7,240,328 B2 | 7/2007 | Beckett et al. | |
| 7,250,853 B2 | 7/2007 | Flynn | |
| 7,281,818 B2 | 10/2007 | You et al. | |
| 7,295,128 B2 | 11/2007 | Petite | |
| 7,305,082 B2 | 12/2007 | Elazar et al. | |
| 7,319,397 B2 | 1/2008 | Chung et al. | |
| 7,327,930 B2 | 2/2008 | Koren et al. | |
| 7,333,745 B2 | 2/2008 | Han et al. | |
| 7,346,186 B2 | 3/2008 | Sharoni et al. | |
| 7,386,105 B2 | 6/2008 | Wasserblat et al. | |
| 7,391,299 B2 | 6/2008 | Bender et al. | |
| 7,474,633 B2 | 1/2009 | Halbraich et al. | |
| 7,476,013 B2 | 1/2009 | Gergets et al. | |
| 7,480,501 B2 | 1/2009 | Petite | |
| 7,526,322 B2 | 4/2009 | Whistler | |
| 2001/0024163 A1 | 9/2001 | Petite | |
| 2002/0019725 A1 | 2/2002 | Petite | |
| 2002/0024424 A1 | 2/2002 | Burns et al. | |
| 2002/0048174 A1 * | 4/2002 | Pederson | 362/487 |
| 2002/0067615 A1 | 6/2002 | Muller | |
| 2002/0071267 A1 | 6/2002 | Lekson et al. | |
| 2002/0071268 A1 | 6/2002 | Pederson | |
| 2002/0112026 A1 * | 8/2002 | Fridman et al. | 709/217 |
| 2002/0116242 A1 | 8/2002 | Vercellone et al. | |
| 2002/0181232 A1 | 12/2002 | Martineau | |
| 2003/0028536 A1 | 2/2003 | Singh et al. | |
| 2003/0061323 A1 | 3/2003 | East et al. | |
| 2003/0069688 A1 | 4/2003 | Mosis | |
| 2003/0078029 A1 | 4/2003 | Petite | |
| 2003/0095688 A1 * | 5/2003 | Kirmuss | 382/105 |
| 2003/0141990 A1 * | 7/2003 | Coon | 340/902 |
| 2004/0008519 A1 | 1/2004 | Todaka et al. | |
| 2004/0036594 A1 | 2/2004 | Ladow et al. | |
| 2004/0044553 A1 | 3/2004 | Lambert et al. | |
| 2004/0049345 A1 | 3/2004 | McDonough et al. | |
| 2004/0057410 A1 | 3/2004 | Kaipianen et al. | |
| 2004/0070515 A1 | 4/2004 | Burkley et al. | |
| 2004/0114391 A1 | 6/2004 | Watkins et al. | |
| 2004/0137768 A1 | 7/2004 | Haehn et al. | |
| 2004/0142678 A1 | 7/2004 | Krasner | |
| 2004/0145481 A1 | 7/2004 | Dilbeck et al. | |
| 2004/0183687 A1 | 9/2004 | Petite et al. | |
| 2004/0186644 A1 * | 9/2004 | McClure et al. | 701/50 |
| 2004/0189490 A1 | 9/2004 | Halishak | |
| 2004/0193740 A1 | 9/2004 | Kasmirsky et al. | |
| 2004/0246144 A1 | 12/2004 | Siegal et al. | |
| 2005/0001720 A1 | 1/2005 | Mason et al. | |
| 2005/0018622 A1 | 1/2005 | Halbraich et al. | |
| 2005/0034075 A1 | 2/2005 | Riegelman et al. | |
| 2005/0047167 A1 | 3/2005 | Pederson et al. | |
| 2005/0057941 A1 * | 3/2005 | Pederson et al. | 362/542 |
| 2005/0083404 A1 * | 4/2005 | Pierce et al. | 348/148 |
| 2005/0109394 A1 | 5/2005 | Anderson | |
| 2005/0117326 A1 | 6/2005 | Ma et al. | |
| 2005/0123115 A1 | 6/2005 | Gritzer et al. | |
| 2005/0134283 A1 | 6/2005 | Potempa | |
| 2005/0151642 A1 | 7/2005 | Tupler et al. | |
| 2005/0162265 A1 | 7/2005 | Werner et al. | |
| 2005/0174229 A1 * | 8/2005 | Feldkamp et al. | 340/506 |
| 2005/0176403 A1 | 8/2005 | Lalos | |
| 2005/0190055 A1 | 9/2005 | Petite | |
| 2005/0197871 A1 | 9/2005 | Mendonca et al. | |
| 2005/0201397 A1 | 9/2005 | Petite | |
| 2005/0219044 A1 | 10/2005 | Douglass et al. | |
| 2005/0239477 A1 | 10/2005 | Kim et al. | |
| 2005/0242969 A1 | 11/2005 | Deutsch et al. | |
| 2005/0243867 A1 | 11/2005 | Petite | |
| 2005/0245232 A1 | 11/2005 | Jakober et al. | |
| 2005/0258942 A1 * | 11/2005 | Manasseh et al. | 340/425.5 |
| 2005/0275549 A1 | 12/2005 | Barclay et al. | |
| 2005/0282518 A1 | 12/2005 | D'Evelyn et al. | |
| 2006/0002122 A1 | 1/2006 | Griffin et al. | |
| 2006/0002372 A1 | 1/2006 | Smith | |
| 2006/0009190 A1 | 1/2006 | Laliberte | |
| 2006/0034070 A1 | 2/2006 | Kovacik et al. | |
| 2006/0045185 A1 | 3/2006 | Kiryati et al. | |
| 2006/0059139 A1 | 3/2006 | Robinson | |
| 2006/0061997 A1 | 3/2006 | Lin | |
| 2006/0068752 A1 | 3/2006 | Lin et al. | |
| 2006/0071775 A1 | 4/2006 | Otto et al. | |

(56) References Cited

U.S. PATENT DOCUMENTS

| | | | |
|---|---|---|---|
| 2006/0092043 A1 | 5/2006 | Lagassey | |
| 2006/0109113 A1 | 5/2006 | Reyes et al. | |
| 2006/0114853 A1 | 6/2006 | Hasty, Jr. et al. | |
| 2006/0133624 A1 | 6/2006 | Waserblat et al. | |
| 2006/0136597 A1 | 6/2006 | Shabtai et al. | |
| 2006/0146740 A1 | 7/2006 | Sheynman et al. | |
| 2006/0158329 A1 | 7/2006 | Burkley et al. | |
| 2006/0161713 A1* | 7/2006 | Belady | 710/303 |
| 2006/0179064 A1 | 8/2006 | Paz et al. | |
| 2006/0187015 A1 | 8/2006 | Canfield | |
| 2006/0190576 A1 | 8/2006 | Lee et al. | |
| 2006/0227719 A1 | 10/2006 | Halbraich | |
| 2006/0268847 A1 | 11/2006 | Halbraich et al. | |
| 2006/0285665 A1 | 12/2006 | Wasserblat et al. | |
| 2007/0008174 A1 | 1/2007 | Schwartz | |
| 2007/0035962 A1 | 2/2007 | Yurochko | |
| 2007/0041220 A1 | 2/2007 | Lynch | |
| 2007/0069913 A1* | 3/2007 | Hatten et al. | 340/691.1 |
| 2007/0083298 A1* | 4/2007 | Pierce et al. | 701/1 |
| 2007/0097212 A1* | 5/2007 | Farneman | 348/143 |
| 2007/0122003 A1 | 5/2007 | Dobkin et al. | |
| 2007/0194906 A1 | 8/2007 | Sink | |
| 2007/0195706 A1 | 8/2007 | Sink | |
| 2007/0211866 A1 | 9/2007 | Sink | |
| 2007/0213088 A1 | 9/2007 | Sink | |
| 2007/0218910 A1 | 9/2007 | Hill et al. | |
| 2007/0242472 A1 | 10/2007 | Gergets et al. | |
| 2007/0250318 A1 | 10/2007 | Waserblat et al. | |
| 2008/0036583 A1* | 2/2008 | Canfield | 340/468 |
| 2008/0040110 A1 | 2/2008 | Pereg et al. | |
| 2008/0066184 A1 | 3/2008 | Ben-Ami et al. | |
| 2008/0144528 A1 | 6/2008 | Graves et al. | |
| 2008/0148397 A1 | 6/2008 | Litvin et al. | |
| 2008/0152122 A1 | 6/2008 | Idan et al. | |
| 2008/0154609 A1 | 6/2008 | Wasserblat et al. | |
| 2008/0181417 A1 | 7/2008 | Pereg et al. | |
| 2008/0189171 A1 | 8/2008 | Wasserblat et al. | |
| 2008/0195385 A1 | 8/2008 | Pereg et al. | |
| 2008/0195387 A1 | 8/2008 | Zigel et al. | |
| 2008/0228296 A1 | 9/2008 | Eilam et al. | |
| 2009/0007263 A1 | 1/2009 | Frenkel et al. | |
| 2009/0012826 A1 | 1/2009 | Eilam et al. | |
| 2009/0033745 A1 | 2/2009 | Yeredor et al. | |
| 2009/0043573 A1 | 2/2009 | Weinberg et al. | |
| 2013/0229289 A1* | 9/2013 | Bensoussan et al. | 340/902 |

FOREIGN PATENT DOCUMENTS

| | | |
|---|---|---|
| CA | 2433711 A1 | 12/2003 |
| FR | 2 648 665 A1 | 12/1990 |
| WO | WO 98/18652 A1 | 5/1998 |
| WO | WO 00/06420 A1 | 2/2000 |
| WO | WO 00/26420 | 2/2000 |
| WO | WO 00/21053 | 4/2000 |
| WO | WO 00/55825 | 9/2000 |
| WO | WO 03/023729 A1 | 3/2003 |
| WO | WO 03/067884 A1 | 8/2003 |
| WO | WO 2004/010398 A1 | 1/2004 |
| WO | WO 2004/038594 A1 | 5/2004 |
| WO | WO 2007/117854 A2 | 10/2007 |
| WO | WO 2008/127016 A1 | 10/2008 |

OTHER PUBLICATIONS

"Wireless LAN in Public Safety, 802.11b: Transforming the Way Public Safety Agencies Transfer Information," brochure, www.northropgrummanIT.com, Northrop Grumman Information Technology (© 2003).

"Wireless LAN Infrastructure Mesh Networks: Capabilities and Benefits: A Farpoint Group White Paper," Document No. FPG 2004-185.1 Farpoint Group (Jul. 2004).

"Public Safety: 4.9 GHz Wireless Mesh Networks for Public Safety and First Responders," Firetide Inc., www.firetide.com (© 2004-2005).

Miller, Leonard E. "Wireless Technologies and the SAFECOM SoR for Public Safety Communications" *Wireless Communication Technologies Group, Advanced Network Technologies Division, Information Technology Laboratory, National Institute of Standards and Technology*, Gaithersburg, Maryland (2005).

"Hot Port™ 4.9 GHz Public Safety Mesh Network" brochure, Firetide Inc., www.firetide.com (© 2005).

"An Introduction to Wireless Mesh Networking" White Paper, Firetide, Inc,. www.firetide.com (Mar. 2005).

Wolff, Robert "Better Communication Through MESH Technology" *Bourbonnais Harold* (Apr. 4, 2006).

Siemens Building Technologies "MM 8000: Simple and Secure Danger Management" Siemens Switzerland, Ltd. (Jun. 2005).

Gralla, Preston, "How Wireless Works", Second Edition, Only Part 4, Chapters 14, 15, 16, 17, 18 and 19, (© 2006).

Wiggins, Roberta "Myths and Realities of Wi-Fi Mesh Networking" Yankee Group Report, Yankee Group Research, Inc. (Feb. 2006).

SYS Technologies (SYS) Corporate Fact Sheet, Jun. 30, 2006.

Imel, Kathy J., et al., "Understanding wireless Communications in Public Safety", A Guidebook to Technology, Issues, Planning, and Management, First Edition: Mar. 2000; Revised: Aug. 2000; Second Edition: Jan. 2003.

Gilsinn, James, D., et al., "Wireless Interfaces for IEEE 1451 Sensor Networks", Slon '01 Sensors for Industry Conference, Rosemont, IL (Nov. 5-7, 2001).

Roff, Graham, IEEE 1451 Overview "A Smart Transducer Interface for Sensors and Actuators" (May 13, 2004).

Success Story: Chicago Police Department, Chicago Police—Video Surveillance, Wave, Wireless Corporation, www.wavewireless.com (page downloaded Apr. 2006).

Van Dyck, Robert E. and Miller, Leonard E. "Distributed Sensor Processing Over an Ad Hoc Wireless Network: Simulation Framework and Performance Criteria," Wireless Communications Technologies Group; National Institute of Standards and Technology (2001).

Miller, Leonard E. "Wireless Technologies and the SAFECOM SoR for Public Safety Communications" (2005).

Chevallay, C., et al., "Self-Organization Protocols for Wireless Sensor Networks," 2002 Conference on Sciences and Systems, Princeton University (Mar. 20-22, 2002).

Van Dyck, Robert E. "Detection Performance in Self-Organized Wireless Sensor Networks," National Institutes of Standards and Technology (Jun.-Jul. 2002).

Conner, Margery "Wireless-Sensor Networks: Find a Fit in the Unlicensed Band," (Mar. 16, 2006).

Knuth, Dean "Wireless LAN Technology in Public Safety," Northrop Grumman Mission Systems (Jun. 2004).

Project MESA: an Update, "Making Progress Toward an International PPDR Standard" pp. 1-7 (Sep. 2003).

"Multi Layered Security Framework for Metro-Scale Wi-Fi Networks", A Security White Paper (Feb. 2005).

"Metro-Scale Mesh Networking with Tropos MetroMesh™ Architecture", A Technology Whitepaper (Feb. 2005).

"Public Safety and Public Access: Granbury, Texas & Frontier Broadband", A Tropos Networks Case Study (Nov. 2005).

"Price-Performance Comparison: 3G and Tropos MetroMesh Architecture", A Technology Whitepaper (Apr. 2004).

"Understanding Wi-Fi and WiMAX as Metro-Access Solutions", White Paper, Wi-Fi and WiMax Solutions, (2004).

Audeh, Malik, "Metropolitan Scale Wi-Fi Networks", IEEE Computer, pp. 119-121 (Dec. 2004).

Lewis, Richard C., "Rhode Island Ready to Launch Statewide Wireless Network" Technology News (Apr. 28, 2006).

"Broadband Public Safety Data Networks in the 4.9 GHz Band: Potential, Pitfalls & Promise", *A Technology Whitepaper* (Mar. 2004).

Morris, Tom, "IRC's Anotherm™ PC Boards Eliminate Heatsinks for Automotive LED Applications", *TT electronics*, Jun. 17, 2003 (2 page).

Article entitled: "Surface Mount LEDs: The Winding Road to Today's Solutions", *Dialight, The Worldwide Leader in LED Technology*, Copyright 2005 (4 pages).

(56) References Cited

OTHER PUBLICATIONS

Morris, Tom, "Aluminum Substrates Make Light Work of Visible LED Circuits", *Canadian Electronics Buyer's Guide*, Mar. 3, 2006 (2 pages).
News Release entitled: "Substrate Solves Power LED Thermal Problems", *TT Electronics Welwyn Components*, Apr. 15, 2004 (2 page).
Product News entitled: "Aluminum Substrate PCBs eliminate heatsinks in automotive LED Lighting", *Reed Electronics Group*, May 2004 (1 page).
Morris, Tom, "IRC's Anotherm™ Technology Enables LEDs to Operate at Full Power", *TT electronics*, Feb. 15, 2006, ( 3 page).
Abstract from Dialog of the article for: Atjoi, et al., *Proceedings 9th IEEE International Workshop on Robot and Human Interactive Communication*. IEEE RO-MAN 2000 (Cat. No. 00TH8499) 96-100 (2000).
Abstract from Dialog of the article for: Atjoi, et al., *Transactions of the Institute of Electrical Engineers of Japan*, Part C, 122-C(10) 1846-1855 (Oct. 2002).
Abstract from Dialog of the article for: Atjoi, et al., *Electrical Engineering in Japan*, 147(1), 60-69 (Apr. 15, 2004).
Abstract from Dialog of the article for: Bruzewicz, A.J., "Remote Sensing and GIS for Emergency Management" *Proceedings of the First Federal Geographic Technology Conference, Exposition and DataMart* (Sep. 26-28 1994).
Full Text Article from Dialog entitled: "Department of Energy Improves Emergency Communications Management With SeNTinel WebEOC From CML Emergency Services Inc. "*PR Newswire*, p. 5336 (Aug. 3, 2000).
Abstract from Dialog of the article for: Dong, Pinlian, "Development of a GIS/GPS-based Emergency Response System", *Geomatica*, 59(4), 427-433 (2005).
Abstract from Dialog of the article for: Gadomski, et al, "An Approach to the Intelligent Decision Advisor (IDA) for Emergency Managers" *6th Annual Conference of the International Emergency Management Society* (1999).
Abstract from Dialog of the article for: Gadomski, et al., "Towards Intelllignet Decision Support Systems for Emergency Managers: the IDS approach", *International J. of Risk Assessment & Management*, 2(3-4), 224-242 (2001).
Full Text Article from Dialog entitled: "Globalstar Develops Wireless Emergency Management Communications System for Disaster Response" *PR Newswire* (Oct. 6, 2005).
Abstract from Dialog of the article for: Gross, "The Design and Management of an International Disaster Information Resource Network (Binding an Emergency Lane on the Information Superhighway)," *The International Emergency Management and Engineering Conference 1995* (May 9-12, 1995).
Abstract from Dialog of the article for: Hamit, "Out from R and D: A Net-based Command and Control Virtual Community for Emergency Management", *Advanced Imaging*, 13(2), 81-82 (Feb. 1998).
Full Text Article from Dialog entitled: "Homeland Security Official Seeks Coherent Wireless Strategy" *Communications Daily* (Dec. 11, 2002).
Abstract from Dialog of the article for: Laben, "Integration of Remote Sensing Data and Geographic Information System Technology for Emergency Managers and Their Applications at the Pacific Disaster Center", *Optical Engineering*, 41(9), 2129-2136 (Sep. 2002).
Full Text Article from Dialog entitled: Morrissey, et al., Red Cross to Use Portable LANs to Coordinate Disaster Relief *PC Week*, 5(5), C1 (Feb. 2, 1988).
Full Text Article from Dialog entitled: "National Center for missing & Exploited Children Joins Forces with Nextel, Comlabs, and the Pennsylvania State Police to Develop New Wireless Amber Alert Service" *Business Wire* (Jul. 12, 2004).
Full Text Article from Dialog entitled: NexGen City™, Public Safety Wireless Network Provider, Deploys SPECTRUM® INFINITY™; Aprisma Solution Ensures Availability of Data, Voice and Video fro NexGen City's Wireless First Responder Network, *PR Newswire* (Jul. 12, 2004).
Full Text Article from Dialog entitled: "XM Radio and Weather Works to Launch Breakthrough Real-Time Weather Data Service for Aviation, Marine and Emergency Management; Garmin and Heads Up Technologies to Provide State-of-the-Art Receivers" *PR Newswire* (Apr. 7, 2003).
Siuru, William, "Police Cars go High-Tech" *Popular Electronics*, 11, 59-62 (Aug. 1994).
Boomer, Rachel "Test Car Has Perks, Lacks Basics," *Halifax Daily News, Weekly Edition*, 87 (Nov. 12, 1997).
"Guide Lightbar Guidance Added to Case IH Line," *Successful Farming*, 101(2), 40A, (Feb. 1, 2003).
Storey, Denis "IWCE 2003 Preview" *Mobile Radio Technology*, 21(2) (Feb. 1, 2003).
"IWCE—Cimarron Technologies" *Mobile Radio Technology*, 21(3) (Mar. 1, 2003).
Dees, Tim "The Patrol Video Project," *Law & Order*, 52(7), 92 (Jul. 1, 2004).
"Cisco 3200 Series Wireless and Mobile Router—2.4-GHz and 4.9-GHz Antenna Guide" product reference, Cisco Systems Inc. (© 2005).
Ethan WAN Systems Product page regarding "TS900/TS930 Series", unknown date retrieved from http://www.etherwan.com/products.aspx?categoryID=246 on Oct. 11, 2006.
Data Sheet entitled "Axis 211/211A Network Cameras-Superior video quality for professional indoor and outdoor applications", AXIS Communications (2006).
Data Sheet entitled "Transforming SCADA as you know it", TERRA Intelligent RTU, Federal Signal Controls, (2006).
Product page entitled "GPS Vehicle Tracking Units: Shadow Tracker™ 2000", retrieved from http://www.onetrackinc.com/Shadow-Tracker-2000.htm on Oct. 10, 2006.
Calem, Robert E., "Battle of the Networking Stars: Part One—ZigBee and Z-Wave wireless technologies fight for the home", Digital Connect Magazine, 2005, n 008, p. 35.
Paillard, Cedric "Chips square off on Zigbee", Electronic Engineering Times, 2005, n 1365, p. 66.
Bulk, Frank, Update: Wireless Lan Battle Plan—"We pitted four top products against one another in a second WLAN competition. As in the first contest, Airespace's entry earned our Editor's Choice award" Network Computing, 2005, n 1603, p. 51.
DeMaria, Michael J., Last Line of Defense—Perimeter Security Is Failing Us. Look to a Host-Based Approach to Protect Your Enterprise From Strikes Against Multiple Fronts Network Computing, 2004, n 1508, p. 38.
DeMaria, Michael J., "Home Smart Home", Network Computing, 2002, n 1301, p. 55.
Yoshida, Junko, "Buzz surrounds ZigBee as pervasive wireless spec", Electronic Engineering Times, 2001, n 1192, p. 16.
Curran, Lawrence, "Embedded MCUs/MPUs Weather the Storm—Embedded Processors Are Finding More Diverse Applications, With 32-Bit Devices Building Steam", EBN, 2001, n 1257, p. 55.
Krochmal, Mo, "You Lead, They Will Follow: Footprints paints a digital map of consumers' trails—New IBM Technology Follows Retail Customers' Footsteps", Computer Reseller News, 2000, n 880, p. 69.
Medford, Cassimir, "Changing Fortunes—Vendors Gauge Their Integrator Relationships (Systems/ Network Integration)" Varbusiness, 1993, n 905 , 91.
Geoffrey, James, "The future that never was: seven products that could have changed the industry but didn't", Electronic Business, 31, 12, 46(6) Dec. 2005.
Cravotta, Robert, "Charting your course: follow the silicon-breadcrumb trail in this directory to find the perfect device for your project. (The 32nd Annual Microprocessor Directory) (Cover Story)", EDN, 50, 16, 57(11) Aug. 4, 2005.
Grimes, Brad, "With wireless, it's good to learn from others: agency initiatives offer valuable lessons about technology and security.(technology use by Army)" Government Computer News, 24, 20, 34(1) Jul. 25, 2005.
"Spotwave to Launch Home Indoor Wireless Coverage.(launch of wireless communications equipment by Spotwave Wireless Inc.)", eWeek, NA Mar. 14, 2005.

(56) References Cited

OTHER PUBLICATIONS

Bulk, Frank—Update: " Wireless Lan Battle Plan—We pitted four top products against one another in a second WLAN competition. As in the first contest, Airespace's entry earned our Editor's Choice award", Network Computing, 51 Feb. 17, 2005.
Margulius, David L., "IPv6 marches forward—The next-generation Internet Protocol could spark a new generation of embedded and mobile network applications", InfoWorld, 26, 50, 8—Dec 13, 2004.
DeMaria, Michael J., "Last Line of Defense—Perimeter Security Is Failing Us. Look to a Host-Based Approach to Protect Your Enterprise From Strikes Against Multiple Fronts", Network Computing, 38 Apr. 29, 2004.
Rash, Wayne, Security Adviser: Your security tune-up—It's 2003 and already it's time to review existing policies and perform vital status checks, InfoWorld, 25, 3, 26 Jan. 20, 2003.
Amato, Ivan, "Big Brother Logs on.(increasing surveillance and lack of privacy increases)", Technology Review (Cambridge, Mass.), 104, 7, 59 Sep. 2001.
Krochmal, Mo, "You Lead, They Will Follow: Footprints paints a digital map of consumers' trails—New IBM Technology Follows Retail Customers' Footsteps. (Company Business and Marketing)", Computer Reseller News, 69 Feb. 7, 2000.
Lammers, David, "Network-ready home appliances blanket show(intelligent deices linked over networks featured at International Housewares 2000 Tradeshow)(Company Business and Marketing)", Electronic Engineering Times, 24, Jan. 24, 2000.
Jones, Timothy, "Healthcare Roundup (Buyers Guide)", Teleconnect, 7, 2, 49(1) Feb. 1999.
Dodge, John, "Hidden VPN Security Costs Are Worth the Price. (Virtual private networks) (Technology Information)" PC Week, v15, n29, p. N29(1)—Jul. 20, 1998.
Davis, Stan, "What's your emotional bandwidth? (keeping people's attention in the computer age)(Forbes @ 80) (Industry Trend or Event)", Forbes, v159, n14, p. 233(1) Jul. 7, 1997.
"Wireless: Ortel issued 3 patents for Series 5800 fiberoptics; advanced technology for in-building cellular coverage. (Industry Legal Issue) EDGE", on & about AT&T, v10, n379, p. 11(1)—Oct. 30, 1995.
"GSM: Ortel announces GSM & DCS1800 versions of series 5800 for in-building cellular coverage using fiberoptic technology; allows cellular operators to maintain competitive edge by enabling new services & expanding coverage areas", EDGE, on & about AT&T, v10, n376, p. 39(1)—Oct. 9, 1995.
"PCS: Ortel announces PCS version of revolutionary Series 5800 Fiberoptic Antennas to provide in-building PCS coverage. New application of fiber-optic technology allows PCS operators to compete with the cellular industry (Personal Communications Network )", EDGE, on & about AT&T, v10, n374, p. 24(1)—Sep. 25, 1995.
"Wireless world: Ortel announces cutting-edge Series 5800 for in-building cellular coverage using fiber-optic technology. (Product Announcement)", EDGE, on & about AT&T, v10, n341, p. 29(1)—Feb. 6, 1995.
Brambert, Dave, "Get board easily? The newest board game: getting market ownership by owning silicon. (Channel News)", LAN Magazine, v8, n13, p. 240(2)—Dec. 1993.
Feit, Edward, "Computer-linked pager improves security, saves Morton money. (Morton International Inc.)", Communications News, v30, n4, p. 24(1) Apr. 1993.
Baron, David et al., "Radio Data Broadcast System debuts. (News from CES and MacWorld) (Brief Article)" Digital Media, v2, n8, p. 19(1)—Jan. 18, 1993.
Cox, John , "Switches simplify WLAN deployment", Journal: Network World, p. 1, Publication Date: Apr. 14, 2003.
Johnson, Maryfran, "The 12 Beeps of Xmas", Journal: Computerworld, p. 20, Publication Date: Dec. 23, 2002.
Briefs—Journal: Computerworld, p. 56, Publication Date: Sep. 30, 1996.
Wexler, Joanie M., "Mobile users just a beep away Start-up's WinBeep to extend reach of Motorola's Alert Central", Journal: Computerworld, p. 51, Publication Date: Feb. 22, 1992.
Eckerson, Wayne, "Revolution in the air Wireless options shaking up the voice system market", Journal: Network World, p. 68, Publication Date: Jun. 15, 1992.
"Senate Govt. Affairs Committee ranking Democrat", Communications Daily Jul. 6, 2004 Document Type: Newsletter.
Ziembicki, M., et al., "Hardware random number generator designed for cryptographic systems", Journal: Kwartalnik Elektroniki i Telekomunikacji , vol. 49, No. 4, p. 503-14 Publisher: Polish Scientific Publishers PWN, Publication Date: 2003 Country of Publication: Poland.
Hudgins-Bonafield, Christy, et al., "Where There's Smoke . . . ", Network Computing, 1996, n 718, p. 22.
Antelman, Leonard, "Mixed-signal ICs getting hotter", Electronic Buyers' News, 1992, n 796, PE 20.
Latest cabling and wiring products.(News Briefs), Communications News, 37, 6, 44 Jun. 2000.
Rigney, Steve, "The network smoke detector . (Kaspia Automated Network Monitoring System 1.1)(Network Edition First Looks) (Software Review)(Evaluation)" PC Magazine, v16, n7, p. NE19(1) Apr. 8, 1997.
"Network diagnostics: LANQuest announces InterView, the first browser-based proactive network diagnostic center.(Product Announcement)", EDGE: Work-Group Computing Report, v8, p. 28(1)—Feb. 3, 1997.
Zyskowski, John, "Controlling current events: choosing an uninterruptible power supply or line protector. (includes related articles on UPS add-ons, shutdown software and simple network management protocol) (Buyers Guide)", Computer Shopper, v16, n4, p. 302(15)—Apr. 1996.
Cohodas, Marilyn J., "Rescue plan. (Federal Emergency Management Agency) (PC Week Executive) (includes related articles on cost savings, walking away from potential disasters)", PC Week, v12, n21, p. E1(2)—May 29, 1995.
Schurr, Amy, "Protection from infection; anti-virus software is a necessary safeguard for networked, stand-alone PCs, say corporate buyers. (includes related set of tips for avoiding virus-related problems) (PC Week Netweek)", PC Week, v11, n42, p. N3(1) Oct. 24, 1994.
Abel, Amee Eisenberg, "World Trade Center bombing underscores need for data-loss prevention. (Brief Article)", Computer Shopper, v13, n7, p. 72(1)—Jul. 1993.
Rossheim, John, "Handwriting-recognition features can make or break pen computing. (Mobile Computing: PC Week Supplement)", PC Week, v10, n15, p. S15(1)—Apr. 19, 1993.
Jacobs, Paula, "How critical is mission-critical? (prioritizing applications and users according to business needs and systems costs) (Enterprise Computing)", HP Professional, v7, n3, p. 36(3)—Mar. 1993.
"New for networks: NetAlarm 2.0 network monitoring. (Meyers and Associates) (Product Announcement)", Newsbytes, pNEW08060022—Aug. 6, 1991.
Cox, John, "Start-up offers high-capacity WLAN gear", Journal:Network World, p. 17, Publication Date: Mar. 28, 2005.
Patch, Kimberly, et al., "Invasion of the embedded systems", Journal: Network World p. 1, Publication Date: Jun. 8, 1998.
Dryden, Patrick, "Kaspia automated network management suite gives an early warning of problems", Journal: Computerworld, p. 61, Publication Date: Sep. 9, 1996.
Gibbs, Mark, "Bad times are just around the corner Net Results", Journal: Network World, p. 22, Publication Date: Feb. 21, 1994.
"Airline Alcohol Restriction Unlikely to Generate Sufficient Support Satellite Today" Jul. 20, 2001 vol. 4 Issue: 138 Document Type: Newsletter.
Results of Google Search performed.
Article entitled "Crist praises work of first responders", article from Ocala Star Banner (Feb. 7, 2006).
"Emergency Alert & Notification Solutions for Government and Business", (Homeland Defense Training Conference), Homeland Defense Journal, Jun. 29, 2006.
"Weather Hazards Assessment", United States Department of Commerce, National Oceanic and Atmospheric Administration, Dec. 28, 2006.

(56) References Cited

OTHER PUBLICATIONS

"Senate Approves Nominees for NTIC, NTSB, Saint Lawrence, Seaway, NOAA and USG", United States Senate Committee on Commerce Science and Transportation, Dec. 11, 2006.
"Executive Order: Public Alert and Warning System" (Press Release) Jun. 26, 2006.
Power Point Presentation entitled "*Arjent S2/Legend Product Introduction*", by Paul Gergets presented during a telephone interview on May 10, 2007, 25 slides.
Federal Signal Corporation Brochure for "*Arjent S2 LED Light Bar*", bulletin #3185, version 306, 4 pages, 2006.
Federal Signal Corporation Brochure for "*Raydian S2 Light Bar*", Bright New Thinking, Preliminary Draft, #m1037, 2 pages, 2007.
Federal Signal Corporation Brochure for "*Legend Light Bar*", As Brilliant Inside as it is Outside, #3190, 3 pages, 2007.
Federal Signal Corporation Brochure for "*Arjent SL Light Bar*", bulletin M1005, version 406, 2 pages, 2007.
Federal Signal Corporation Brochure for "*Raydian SL Light Bar*", bulletin #M1035, version 906, 4 pages, 2006.
Photo of Whelen Lightbar (Model No. SX8BBBB LFL Liberty).
Brochure for Code 3 Public Safety Equipment, Inc., "*LED X™ 2100 Light Bar*", Installation Operation Manual, Jun. 2002.
Brochure for "*Whelen Edge LFL Liberty Linear-LED-Light Bars*", Form# LIB0506, 2006.
Press Release "*Nice Systems Launches Three New Nice Vision Digital Video and Audio Recording Solutions*", retrieved from http:www.nice.com/news/show_pr.oho/id=170 on Apr. 1, 2009 (2 pages).
Product page entitled "*About Nice Vision*" retrieved from http:www.nice.com/products/video/nicevision_about.php on Apr. 1, 2009 (2 pages).
Letter dated Aug. 14, 2007 to Bryan Boettger from the County of Los Angeles Sheriff's Department Headquarters regarding Arjent S2 Light Bars.
Article entitled "*Fight Crime Without Wires: Colorado City's Wireless Network Uses GPRS and Wi-Fi to get information to Public-Safety Workers Faster*," The Gale Group, Information Week, (Feb. 9, 2004).
Enriquez, Darryl, "*Wireless System Appeals to Panel: Idea Now Goes to Waukesha Council*," KRTBN Knight-Rider Tribune Business News—The Milwaukee Journal, (Feb. 16, 2006).
Douglas, Merrill, "*Bringing CAD Into the Field*," Mobile Radio Technology, vol. 22, No. 11, p. 36, (Nov. 1, 2004).
CADVoice® Fire Station Controls: Visual Indicators and Automated Control of Lights, Doors, and More, retrieved from http://locution.com/products/cadvoice_firestation.htm on Jan. 15, 2007.
Highlighted Features and Benefits, :"Fire Station Alerting" retrieved from http://comtechcom.net/fireestationalerting/model10_fire_station_alert on Jan. 15, 2007.
Fire Station Alerting & Controls, Firefigher Health and Safety, retrieved from http//firestationalerting,com/index.pjp?module=ContentExpress on Jan. 15, 2007.
Stallings, William, "Data and Computer Communications", Macmillian Publishing Company, New York, Collier Macmillan Publishers, London, total pp. 604 Copyright 1995.
"Printed Circuit Board and Component Keying and Retention Design" *IBM Technical Disclosure Bulletin*, vol. 33(4) (Sep. 1, 1990).
Supplementary European Search Report 07 75 8625 (Dec. 6, 2011).
Article entitled "*Fight Crime Without Wires: Colorado City's Wireless Network Uses GPRS and Wi-Fi to get Information to Public-Safety Workers Faster*", The Gale Group, Information Week, (Feb. 9, 2004).
Champaign Security System LLC., "The VideoSNITCH Street Sentinel", (2 pages).
Champaign Security System LLC., VideoSNITCH announcement (1 page, Jun. 28, 2004).
Champaign Security Systems, the VideoSNITCH (2 pages, Feb. 8, 2007).
Douglas, Merrill, "*Bringing CAD Into the Field*", Mobile Radio Technology, vol. 22, No. 11, p. 36, (Nov. 1, 2004).
Enriquez, Darryl, "*Wireless System Appeals to Panel: Idea Now Goes to Waukesha Council*", KRTBN Knight-Rider Tribune Business News—The Milwaukee Journal, (Feb. 16, 2006).
SWAP900, Solar Wireless Access Point, iRDATA Corporation, (2 pages, 2006).
European Patent Office, Extended European Search Report in European Patent Application No. 10800494.6, Jan. 23, 2015.

\* cited by examiner

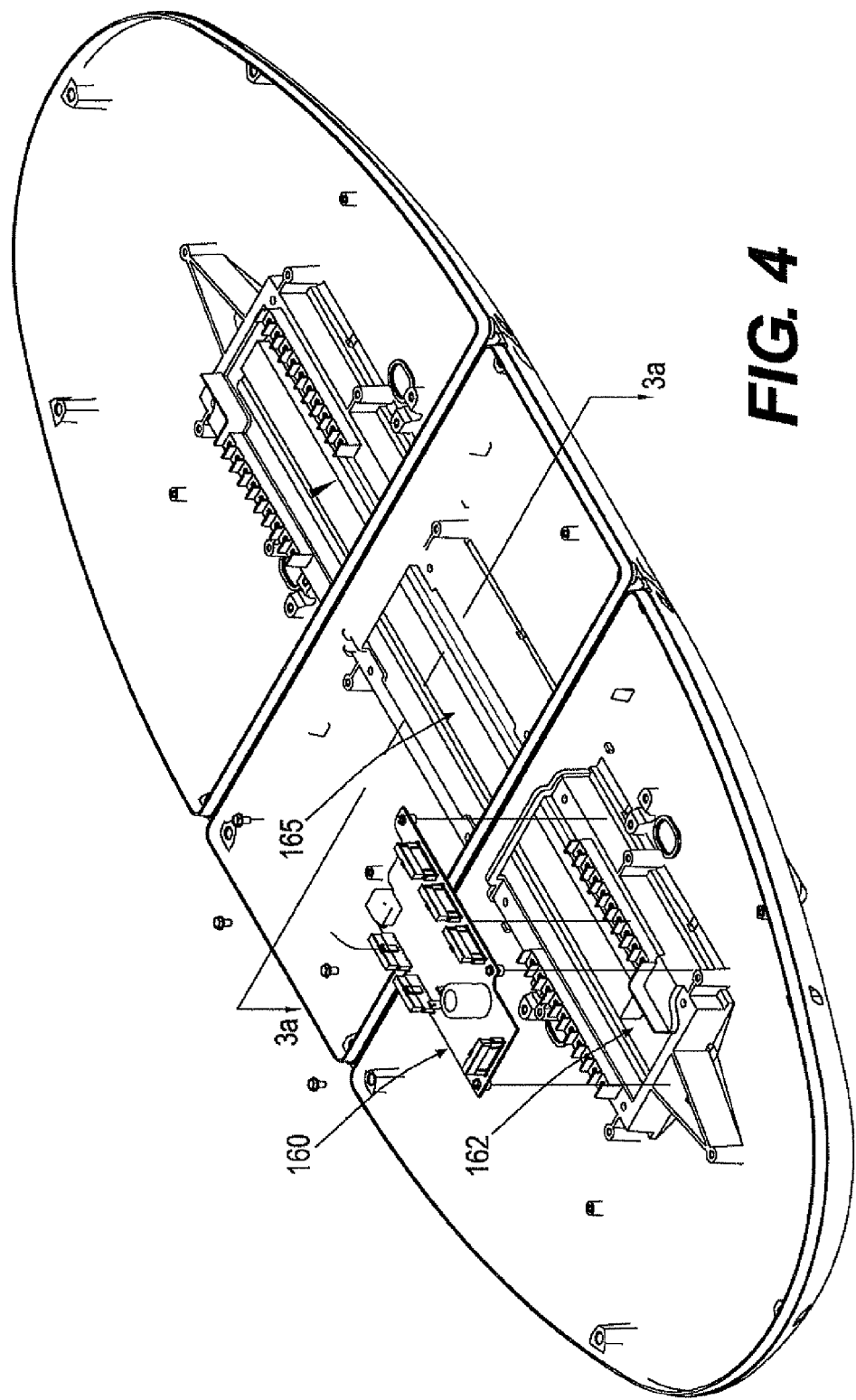

FULLY INTEGRATED LIGHT BAR

CROSS-REFERENCE TO RELATED APPLICATIONS

This application is a continuation-in-part of copending U.S. patent application Ser. No. 11/394,752, filed Mar. 31, 2006, and Ser. No. 11/505,642, filed Aug. 17, 2006, which are hereby incorporated by reference in their entirety for everything that they describe. Additionally, this patent application claims the benefit of U.S. Provisional Patent Application No. 60/775,634, filed Feb. 22, 2006.

BACKGROUND OF THE INVENTION

Typical emergency response vehicles have many different systems for monitoring and responding to various situations and emergencies. For example, the vehicles are equipped with communications equipment that includes both voice and data generating devices such as radios and computers. This and other electronic equipment (e.g., controls for devices such as light bars) crowd the interior space of the vehicle, which is not designed for this concentration of electronics.

It is extremely difficult to equip the vehicles with all of the needed communications, monitoring, and response equipment. Standard commercial vehicles are retrofitted with this equipment through a labor-intensive process. Retro fitting the vehicles is often an iterative process, as new equipment replaces old. Advances in equipment allow first responders to perform their jobs more safely and efficiently. However, each time equipment advances, vehicles must again be retrofitted. Furthermore, when the vehicle is no longer used by emergency services, the equipment must be removed from the vehicle through another costly, labor-intensive process.

In addition to systems for detecting and responding to emergencies, vehicles must be equipped with various communications systems. For example, in the United States public safety officials including fire departments, police departments and ambulance services primarily use communications systems that work within the VHF and UHF bands. Conventional land mobile radios operate on these and other frequencies. Cellular networks, which operate in the UHF frequency band, are also used for public safety communications systems for both data and voice communications. More recently, the SHF band, such as the 4.9 GHz band reserved by the United States Federal Communications Commission (FCC), have been included in public safety communications systems. Moreover, within these several frequency bands, there are a number of communications standards, such as the IEEE 802.11 protocol, utilized to transmit data. Many other frequency bands and communication protocols are used by emergency service personnel around the country. In order to ensure reliable communications across public safety agencies, vehicles are often now equipped with still further electronics that enable public safety personnel to communicate over several transmissions protocols and/or frequency bands. All of the radios and communications equipment results in a cluttered environment.

As technology evolves and finds applications in the area of public safety, emergency response vehicles increasingly carry more equipment to detect and respond to countless situations and emergencies. Typically, individual systems are installed in the vehicle for each of the tasks aimed at emergency responses. For example, a police vehicle monitors traffic using a radar detector. Cameras mounted in an emergency vehicle gather evidence. Many emergency vehicles have light bars mounted to their roofs. Sirens warn citizens of danger. GPS systems inform a control center of the vehicle's location. Vehicles may contain equipment to detect bio-hazards or chemicals in the event of an industrial spill or terrorist attack. Countless other systems are installed in emergency vehicles based on expected situations. This trend can only be expected to continue.

Emergency vehicles are often equipped with emergency lighting equipment that draw attention to the vehicles and provide visual warning to citizens. Typically this equipment includes flashing or rotating lights, which generating a considerable amount of electromagnetic noise. Because of the noisy environment and to assist in visibility, the emergency lighting equipment is most often housed in a module commonly called a "light bar" mounted to a roof of the emergency vehicle. Installing the emergency light equipment in a light bar lessens the effect the electromagnetic noise has on the operation of sensitive telecommunications equipment inside the vehicle.

Installing in emergency vehicles all of this communications, detection and response equipment is costly and labor intensive. All of it is retrofitted into a vehicle manufactured without any accommodation for this special purpose equipment. Some of the equipment, such as radar units and cameras are typically mounted to the front edge of the interior of the roof such that the radar unit and/or the camera extend downwardly to provide views through the front windshield. Power cables are routed from this equipment to the vehicle's power system through the roof lining and down one of the side posts of the car, separating the front and rear car doors, and then to a controller unit, which is located in the trunk, engine compartment or even under a seat in the interior of the vehicle. Many emergency vehicles are equipped with light bars mounted on the roofs of the vehicles. Power and control cables for the light bars are also fished through the side posts and routed to the trunks of the vehicles or to the engine compartments of the vehicles. These cables are fished through the side pillar of the vehicle separating the front and rear doors. Communications antennas are mounted on the roof and on the trunk. Holes are drilled in the car to attach the antennas. Again, cables are routed to a controller in the trunk of the vehicle. Finally, each piece of equipment is wired to controllers in the vehicle's cabin. There are numerous other systems that are regularly installed in emergency vehicles. As technology advances, new devices must be incorporated into emergency vehicles. This requires taking the vehicle out of service for an extended period of time as older devices are removed from the vehicle and newer devices are installed.

By their nature, emergencies often require deployment of more emergency equipment than normally in use at any given time. Communities must determine how best to provide for emergency situations that may require quick deployment of additional equipment. Typically, communities rely on resources from neighboring communities. This strategy works as long as the neighboring communities are close by and not affected by the same emergency. For emergencies that affect large areas, however, relying on neighboring communities to loan their resources is not a workable strategy.

For example, neighboring communities may face a common emergency such as a hurricane, a terrorist attack or an earthquake. In these types of emergencies, the effected communities will need additional emergency vehicles that are not available from nearby neighboring communities. Moreover, because of the labor intensive and costly installation process, non-emergency vehicles cannot be quickly converted for emergency use. Furthermore, existing emergency vehicles may not have the best combination of equipment for dealing with a particular disaster. The time-consuming installation process prevents vehicles from being quickly adapted to respond to an emergency condition that the vehicle is otherwise not equipped to handle.

After a vehicle is no longer needed by public safety agencies, it is typically sold in the aftermarket. However, all of the communications systems and emergency equipment must be removed from the vehicle before sale. If the vehicle is to be resold at maximum value, the damage to the vehicle done during the process of retrofitting the emergency equipment must be repaired. For example, any holes drilled into the vehicle during installation of the equipment must be patched. The dashboard most likely needs to be repaired because of holes drilled in it to run wiring, mount devices and control units. All of this repairing is expensive and reduces the resale value of the vehicle, which represents a substantial amount of lost revenue to communities.

Another problem facing first responders is the lack of a unified communications network for transmitting voice and data. For example, different police departments responding to the same emergency affecting several communities may use different radios. Furthermore, live video taken from one vehicle at the scene of an emergency is not available to other vehicles responding to the emergency. Current attempts to solve communications problems result in even more equipment and radios being installed into vehicles.

BRIEF SUMMARY OF THE INVENTION

A fully integrated light bar is provided that not only houses emergency warning lights, but also houses emergency devices such as telecommunications equipment and community monitoring equipment. In one embodiment, all of the emergency equipment that might otherwise be housed in the interior of the vehicle is housed in the light bar so that a vehicle can be easily and quickly retrofitted. In order to avoid fishing wiring from a control head mounted in the interior of the vehicle to the equipment in the light bar, the connection between the control head and the light bar is preferably a wireless connection. All wiring is avoided if the light bar includes its own source of energy such as a fuel cell, solar cell and/or a battery.

In one embodiment of the invention, the light bar contains a number of modules for sensing real time conditions of the vehicle, its operator and the ambient environment of the vehicle and operator. Example modules include a video camera, a radar unit, a GPS unit, a biological agent sensor and a license plate recognition system. Preferably, the light bar is designed to allow for the custom fitting of modules, thereby enabling a light bar to be equipped with any combination of modules best suited for an application.

In one embodiment of the invention, the light bar houses at least one transceiver for communicating information gathered from sensors (preferably also in the light bar) over a wireless network. In order to enable real time communication of information demanding high data rates, the transceiver is a broadband device such as a Wi-Fi transceiver. Broadband transceivers allow for real time transmission and reception of information such as video feeds and detailed maps of buildings.

In one embodiment of the invention, data from the modules are transmitted over a wireless network to a control center where the data is reviewed and analyzed for activating or informing or otherwise marshalling community resources. Further, information may be transmitted from one fully integrated light bar equipped vehicle to other such vehicles to assist in responding to or monitoring emergencies. These and other embodiments of the invention will be more fully explained in the detailed description of the invention.

BRIEF DESCRIPTION OF THE DRAWINGS

FIG. 4 illustrates a lower portion of a housing for the light bar in FIGS. 2A and 2B including a controller and a fuel cell.

While the following detailed description is made in connection with preferred and alternative embodiments referencing the drawings, the description is not intended to limit the invention to those particular embodiments. On the contrary, the invention is intended to cover all alternatives and equivalents as may be included within the spirit and scope of the invention as defined by the appended claims.

DETAILED DESCRIPTION OF THE INVENTION

The following description is intended to convey the operation of exemplary embodiments of the invention to those skilled in the art. It will be appreciated that this description is intended to aid the reader, not to limit the invention. As such, references to a feature or aspect of the invention are intended to describe a feature or aspect of an embodiment of the invention, not to imply that every embodiment of the invention must have the described characteristic.

Figure 1:
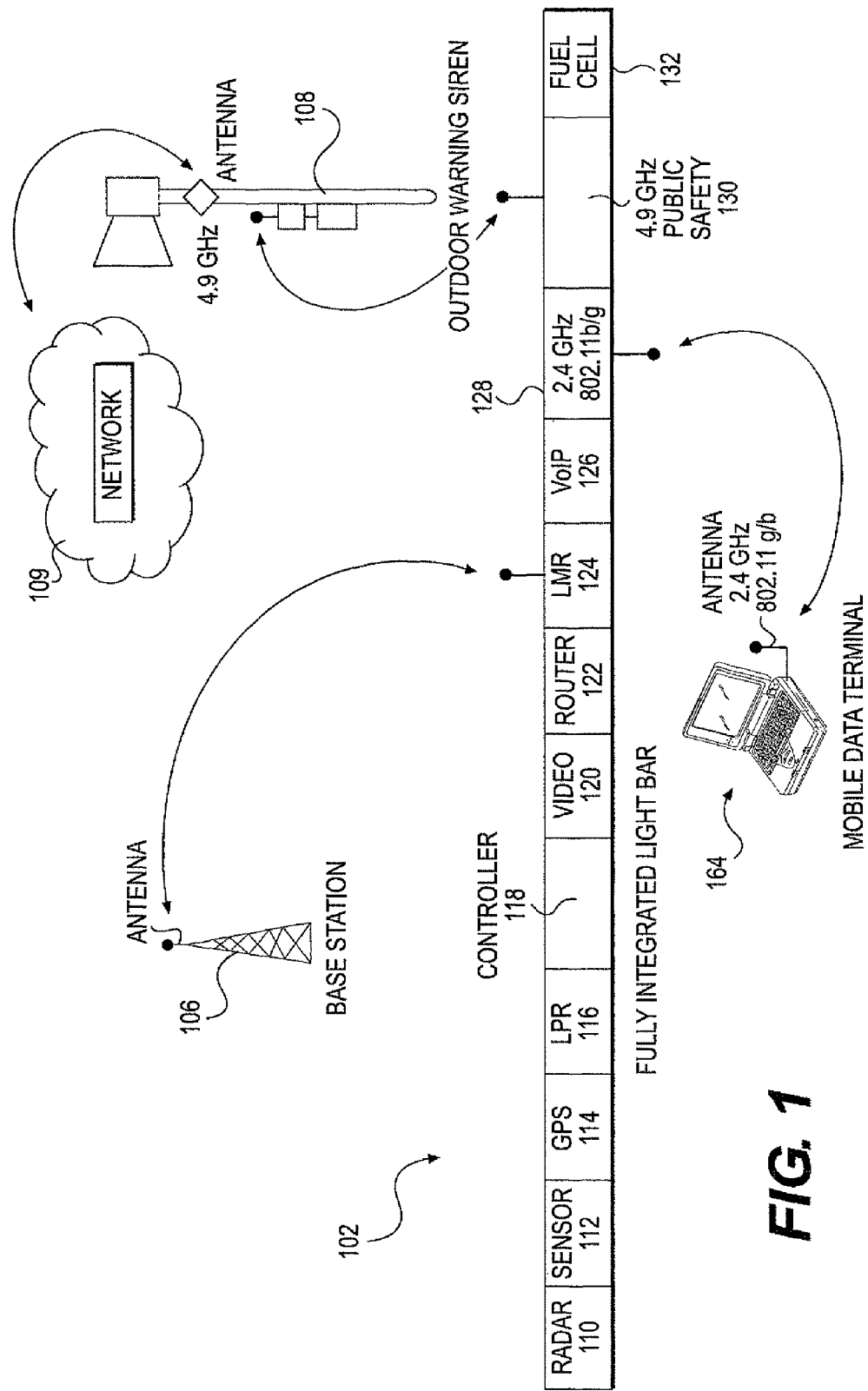
FIG. 1 is a schematic representation of an emergency warning device, such as a light bar, integrated into a broadband community wireless network.

Turning to the drawings and referring first to FIG. 1, an emergency device 102 is in wireless communication with a mobile data terminal 164, a base station 106 and an outdoor warning siren 108. The emergency device 102 contains a number of monitoring, warning and response systems as needed based on its deployment. For example, in one embodiment of the invention, the emergency device 102 is attached to a police vehicle. When it is attached to a police vehicle, the emergency device 102 likely includes modules otherwise located in the vehicles interior spaces. For example, in the illustrated embodiment of FIG. 1, the device includes (1) a video camera 120 for streaming video signals to displays that may be both in the vehicle and at remote locations, (2) a radar unit 110 for detecting the speed of other vehicles, (3) a sensor 112 for detecting the presence of chemical or biological agents, (4) a global positioning system ("GPS") 114 providing the location of the emergency device, and (5) a license plate recognition system ("LPR") 116 providing the license plate number of vehicles in the vicinity. In the illustrated embodiment, each of the modules 110-116 interfaces with a controller 118. Video camera 120 provides video footage (e.g., streaming video) of an area near the emergency device 102. The video camera or module 120 connects to controller 118 or router 122 for routing the video to either an onboard storage or display at the mobile data terminal 164 or routing the video to a remote terminal by way of the base station 106 or a transceiver associated with the outdoor warning siren 108. The outdoor warning siren 108 connects to a wide area network ("WAN") 109. The WAN may be a public network such as the internet or a private network reserved for emergency use. The outdoor warning siren 108 connects directly to the network 109 or connects through a gateway device.

The emergency device 102 also includes several wireless network devices. For example, the emergency device 102 also includes a land mobile radio ("LMR") 124 for communicating with other emergency service personal over a variety of frequencies including the UI-IF and VHF bands. A voice over Internet Protocol ("VoIP") module 126 of the emergency device 102 allows a user of the device to transmit and receive voice messages over standard data networks such as a network based on the IEEE 802.11 standard. A wireless fidelity ("Wi-Fi") module 128 transmits and receives data over an IEEE 802.11 network. A transceiver 130 implements a public safety radio operating at the 4.9 GHz frequency, which the United States Federal Communication Commission (FCC) has dedicated to public safety applications.

Finally fuel cell 132 the emergency device 102 provides power for the emergency device 102. Preferably, the fuel cell is incorporated in the emergency device 102 as suggested by the illustration in FIG. 1. By providing a power source within the emergency device 102, the device is fully self contained and can be easily and quickly retrofitted onto any vehicle.

Although FIG. 1 depicts three transceiver modules, the LMR 124, Wi-Fi 128 and the public safety radio 130, one skilled in the art of telecommunications will appreciate that any appropriate wireless standard may be used to enable communication between the emergency device 102 and remote locations. For example, a cellular transceiver for connection to cellular data or voice networks may be included in the emergency device 102. In general, any number of transceiver types may be employed in the emergency device 102. For example, one Wi-Fi transceiver 128 may provide all necessary communication links. Data signals can utilize the Wi-Fi link and voice may pass over the Wi-Fi link using VoI. On the other hand, a number of specialty transceivers may be employed in the emergency device 102 in order to ensure a more robust communications environment. Embodiments of the emergency device 102 will be more fully described below.

Emergency signaling systems of the type mounted to the roofs of emergency vehicles are commonly called "light bars" because they are typically shaped as bars traversing the roofs of vehicles. In keeping with this convention, in FIG. 2A and FIG. 2B the illustrated emergency signaling system 134 is hereinafter referred to as a "light bar" since it is primarily intended for mounting to the roofs of emergency vehicles such as the roof 136 of the illustrated vehicle 138. However, those skilled in the art of emergency warning device will appreciate that the device described hereinafter as a light bar can take on a variety of shapes and placements throughout a community as the need arises. In one embodiment of the invention, emergency device 102 is integrated into light bar 134 for a vehicle. The emergency device could be mounted to other types of mobile units such as boats and aircraft, Furthermore, the emergency device 102 could also be mounted to stationary objects such as a commercial or residential building in order to convert the building to a temporary emergency command center. In any event, details of the emergency device 102 are set forth below in connection with an embodiment in which the device is the light bar 134 for mounting to the vehicle 138.

Figure 2A:
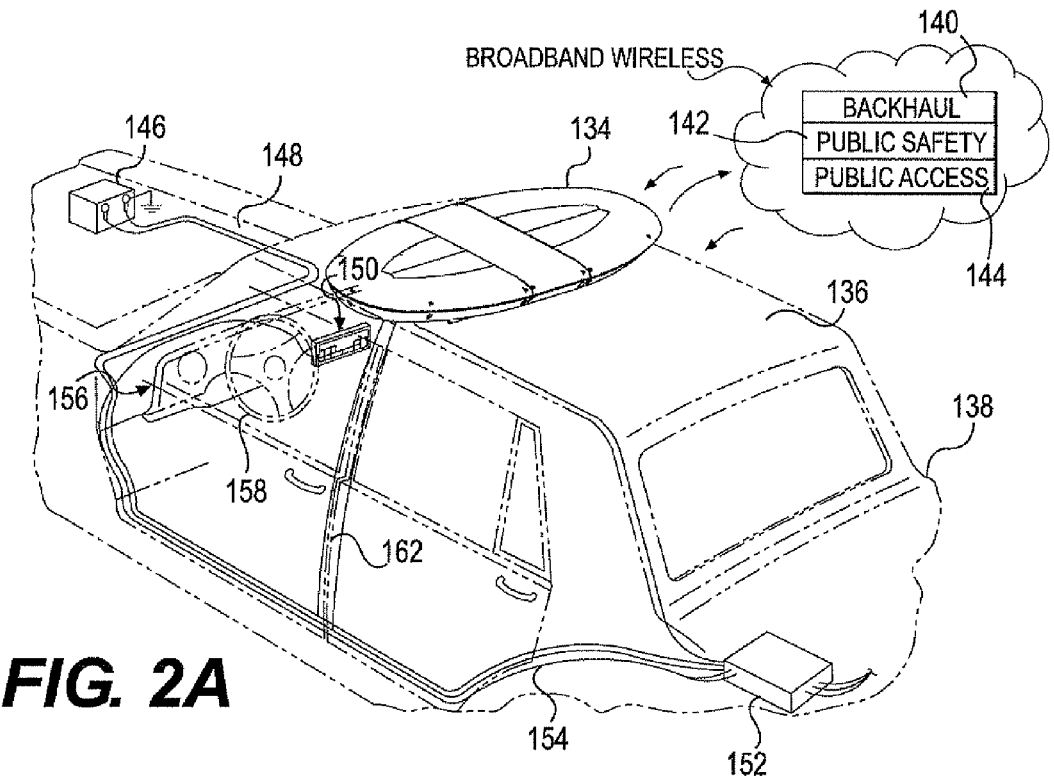
FIGS. 2A and 2B illustrate a the emergency warning device of FIG. 1 integrated into a light bar with a wireless connection to a broadband network and a wired or wireless connection to a control head within a vehicle (FIGS. 2A and 2B, respectively).
Figure 2B:
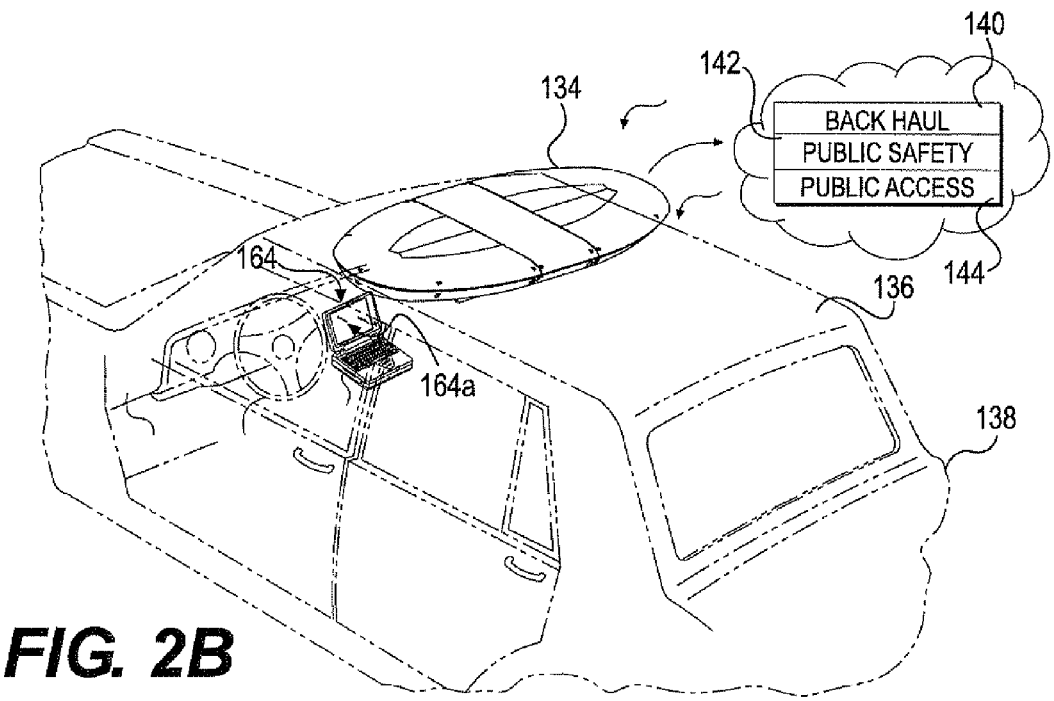

In keeping with one embodiment of the emergency device, the light bar 134 in FIGS. 2A and 2B connects wirelessly to a back haul network 140, a public safety network 142 and a public access network 144. In FIG. 2A, the light bar 134 is wired to the vehicle's power system 146 through cables 148. A control head 150 in the passenger compartment of the vehicle 138 allows an occupant in the vehicle to control the lights and modules 110-130 in the light bar 134. The control head 150 connects to control unit 152 through wires 154 in order to communicate control signals to the modules 110-130 in the light bar 134. The control unit 152 in the illustrated embodiment provides control functions for other emergency signaling apparatus associated with the vehicle 138. For example, the control unit 152 may also serve a siren. The operator of the vehicle 138 preferably mounts the control head 150 to the dashboard/instrument panel area 156 to the right of the steering wheel 158 for easy access. Although the control unit 152 is depicted mounted in the trunk of the vehicle, it may be mounted elsewhere within the vehicle. For example, control unit 152 may be mounted under the dashboard area 156.

Keystrokes to a keypad incorporated into the control head 150 generate control signals and the control head provides the signals to the control unit 152 by way of cables 154, which in turn communicates signals to the control unit 160 (FIG. 4) within the light bar 134 by way of cable 162. A control system such as Federal Signal's Smart Siren™ system is a suitable example of the illustrated control system for certain embodiments of the invention.

In FIG. 2B, the light bar 134 is in wireless communication with a mobile data terminal ("MDT") 164, enabling the light bar to be completely free of external wiring if the power source (e.g., fuel cell and/or solar cell) is contained in the light bar. The MDT 164 replaces the control head 150 in FIG. 2A and controls the lights and modules 110-130 in the light bar 134. MDT 164 may be a conventional laptop computer equipped with a wireless network interface card (NIC). Preferable as explained hereinafter, the MDT 164 includes a touch screen 164a allowing the user to interact with the light bar by simply touching appropriate areas of the screen as prompted by a user interface displayed on the screen.

Any appropriate wireless standard can be used to connect the MDT 164 and the light bar 134. Examples of appropriate standards include Wi-Fi a, b, g, or n as defined by the Institute of Electrical and Electronics Engineers ("IEEE") in the 802.11 specification. Additionally Bluetooth, Wireless USB or Zigbee, which are all based on IEEE 802.15, can be used as the standard between the MDT 164 and the light bar 134. A user controls the system by entering commands into the MDT 164. Commands are entered into the MDT through any appropriate means including use of a keyboard, touch screen 164a or voice recognition software, Commands entered into the MDT are transmitted to the light bar 134 via the wireless network. The MDT 164 can display information gathered by the modules 110-130 located in the light bar 134. For example, in one embodiment of the invention live video from the video camera 120 is displayed on the screen 164a. Speeds of passing vehicles detected by the radar unit 110 are displayed by the MDT 164, Additionally, the MDT 164 displays the license plates of passing vehicles detected by the LPR 116 module.

Figure 3:
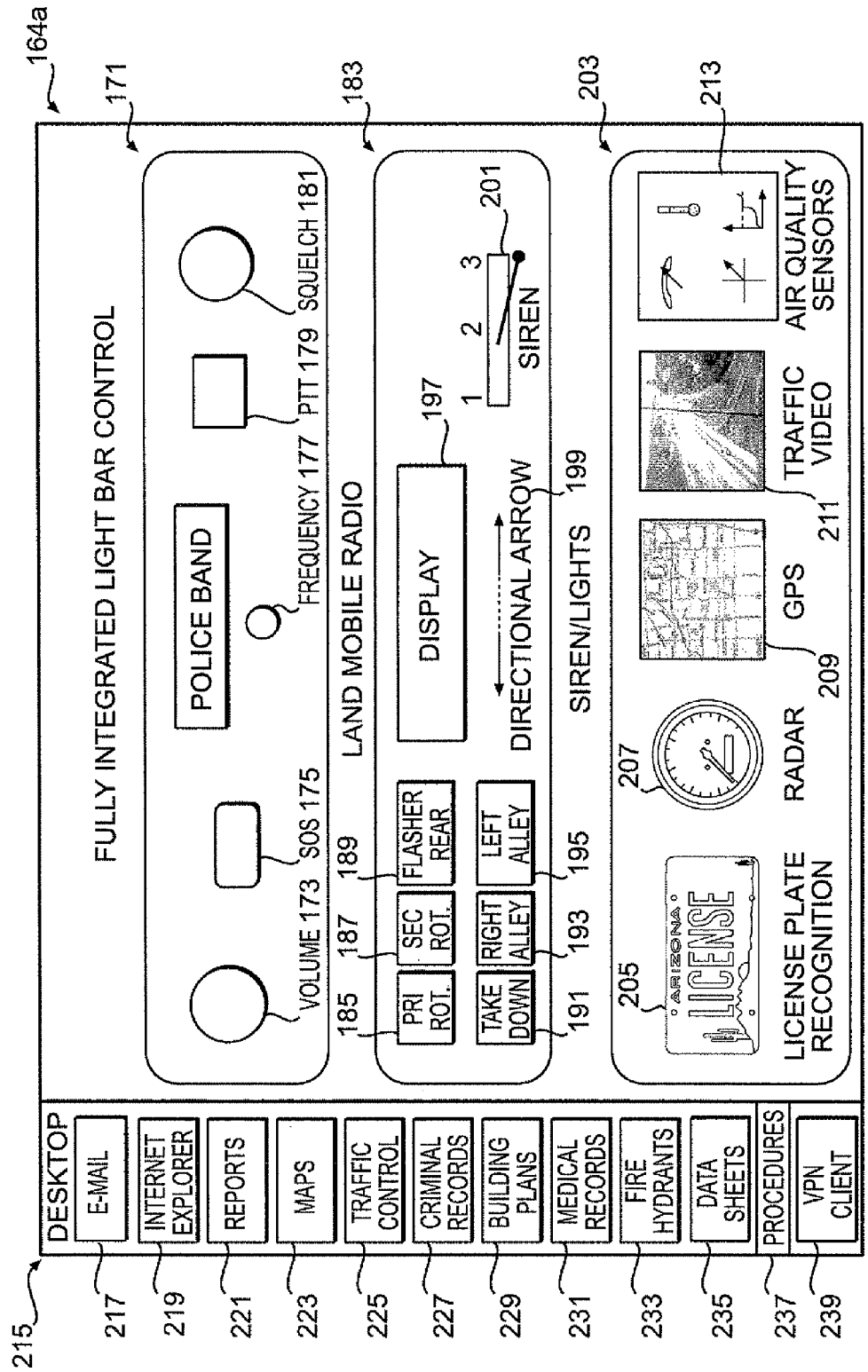
FIG. 3 illustrates a control interface at a mobile data terminal for controlling modules comprising the emergency warning device.

FIG. 3 illustrates one embodiment of the interface for a touch screen 164a integrated into the MDT 164. The touch screen 164a includes a LMR interface 171 that either replaces or is in addition to the standard radio controls already located within the vehicle for communicating with the LMR 124. The interface 171 includes buttons on the touch screen 164a for operating the land mobile radio (LMR) 124 in much the same manner as is accomplished with a conventional, dedicated control head for the LMR that includes mechanical knobs and switches. For example, the user interface 171 provides a volume control 173, a SOS button 175, a frequency control 177, a push to talk control 179 and a squelch button 181.

A light and siren interface 183 controls the light assemblies and siren mounted on a vehicle. The interface 183 includes a primary lights button 185, a secondary lights button 187 and a flasher rear button 189. A take down button 191, right alley button 193 and left alley button 195 operate additional light assemblies. The display 197 indicates the mode that the light assemblies are operating in. Directional control 199 allows the operator to enable flashing directional lighting assemblies. Finally, siren control 201 enables various siren modes.

Module panel 203 displays the current readings for various modules 110-132 housed in the light bar. For example, the license plate recognition system display 205 indicates the license plate number of nearby vehicles. The radar 207 shows the speed of nearby vehicles. The OPS 209 shows a map with nearby emergency vehicles as well as the location of the occupied vehicle. The traffic video 211 shows live video feeds from traffic monitoring cameras located throughout a community. The air quality sensors 213 display information regarding community air quality. Clicking a sensor expands the sensor to a full screen mode. For example, if a user touches the traffic video display 211, it will expand to fill the entire screen.

In another embodiment, the user interface of the touch screen 164a may be similar to the user interface illustrated and described in co-pending U.S. patent application Ser. No. 11/505,642, filed Jun. 17, 2006 and entitled "Integrated Municipal Management Console," which is hereby incorporated by reference in its entirety for everything it describes.

Figure 3A:
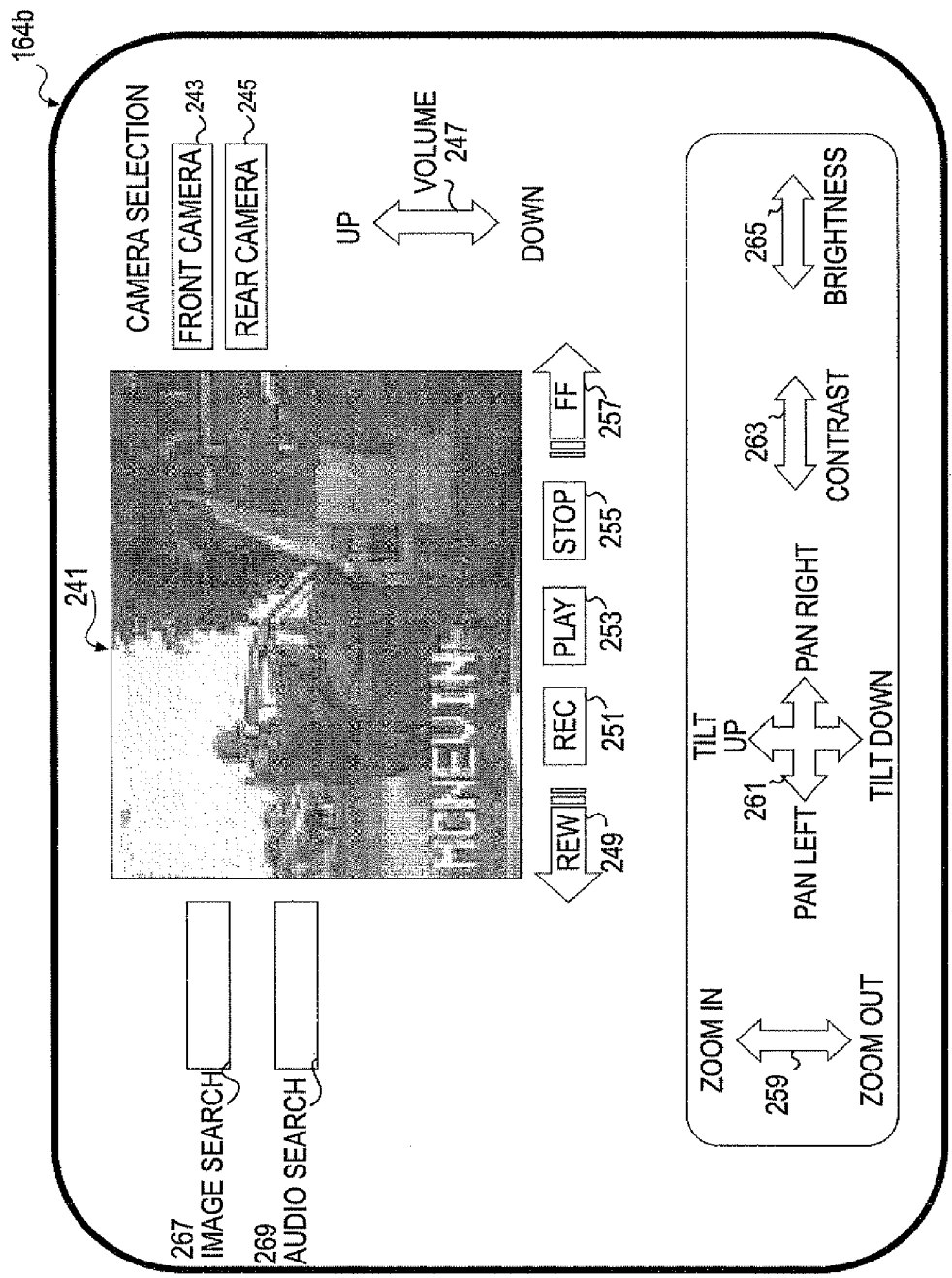
FIG. 3A illustrates a user interface at the mobile data terminal for controlling a video camera mobile of the emergency warning device, where the user interface is accessible from the control interface.

In order to control the devices in the module panel 203 of the user interface 164a, selection of any of the icons 205, 207, 209, 211 and 213 causes a dialog box or window to appear on the touch screen such as the one illustrated in FIG. 3A for the traffic video icon 211. In FIG. 3a, the user interface 164b may be a window or dialog box that appears over the user interface 164a in FIG. 3. Alternatively, the user interface 164b may appear in substitution for the user interface 164a. In either event, the user interface 164b presents to the user various controls for the video camera 120 in FIG. 1. The touch screen interface 164b either replaces or is in addition to standard controls for the video camera 120. The interface 164a includes buttons on the touch screen 164b for operating the video camera 120 in much the same manner as is accomplished with a conventional, dedicated control head for the camera, which includes mechanical knobs and switches. The video display 241 displays a live image from the camera 120 mounted in the emergency device 102 or from remote cameras whose signal is received over the network connection. Additionally, the video display 241 displays recorded images taken by the camera 120 or images recorded by another camera and made available for playback on the display 241.

The user interface 164b contemplates more than one camera 120 in the emergency device 102. In this regard, the user interface 164b includes touch buttons 243 and 245 for selecting front and rear cameras, respectively. A volume control 247 adjusts the audio volume associated with a video. The "rew" touch button 249 rewinds a recorded video segment. The "rec" touch button 251 toggles the record feature of the video camera 120 and MDT 164. The play touch button 253 plays back recorded video. The stop touch button 255 stops video play back. The "FF" touch button 257 fast forwards recorded video. The zoom control 259 zooms in and zooms out of a video image. The pan/tilt control 261 rotates the video image up and down and left and right. The contrast touch button 263 and brightness touch button 265 control the contrast and brightness of the image, respectively. The image search interface 267 and audio search interface 269 allow a user to search for images and audio segments in stored video files.

Returning to the touch screen 164a in FIG. 3, it includes buttons for accessing various computer programs and resources. For example, e-mail button 217 launches a user's email program. Similarly, the Internet Explorer® button 219 launches Microsoft's internet browser. The reports button 221 launches various reports or forms for reports maintained locally or at a remote server. One or more of the broadband wireless connections provides the link to the remote server. Maps button 223 launches mapping software, which presents maps to the user stored either locally or at a remote server. The traffic control button 225 launches a program whose interface enables the user to control traffic intersection lights. Touching the criminal records button 227 launches a program that enables access to criminal records stored either locally or at a remote server. The building plans button 229 gives the user access to databases of building plans for various buildings stored either locally or at a remote server. Similarly, the medical records button 231 allows a user to search databases of medical records maintained either locally or at a remote server. The fire hydrants button 233 launches a program that displays the location of nearby fire hydrants. The virtual private network (VPN) client 239 provides a secure connection over otherwise public networks to the first responder's server to access remote databases containing confidential information such as police records. While the VPN client button may allow for browsing of remote databases, the data sheets button 235 allows a user to search remote data sheets, which may contain information such as details of particular types of chemicals involved in a chemical spill. The procedures button displays procedures 237 for handling situations faced by first responders at a scene of an emergency. For example, a data sheet may provide guidance for dealing with a heart attack victim or how best to react to a water rescue.

Information such as voice and data signals sent over a wide area network ("WAN") and received by one of the transceivers LMR 124, Wi-Fi 128 or public safety 130 can be forwarded to the MDT 164 through the wireless connection between it and the light bar 134. These messages can either be displayed on the MDT's screen or audibly played over speakers either in the vehicle or in the MDT. Messages originating as voice signals can be play directly. Messages originating as data signals can be converted to voice signals by use of commercially available text-to-speech software and played audibly over speakers in the vehicle.

In one embodiment of the emergency device 102, a transceiver sends and receives messages encoded in data packets, an exemplary one of which is illustrated below. The data packet includes a header with information indicating the beginning of a packet. An encryption section contains information related to the encryption of the packet. An address section may contain items such as the emergency device's IP address and MAC address and the packet's destination IP address and MAC address. The data section contains the packet's payload. The payload includes the data to be transmitted. One skilled in the art of communications will recognize that data packets may consist of various fields and are not limited to the specific fields recited. For example, the data format may be TCP/IP based and include IEEE 802.1x compatibility.

| Header | Encryption | Address | Payload |
| --- | --- | --- | --- |

Figure 7:
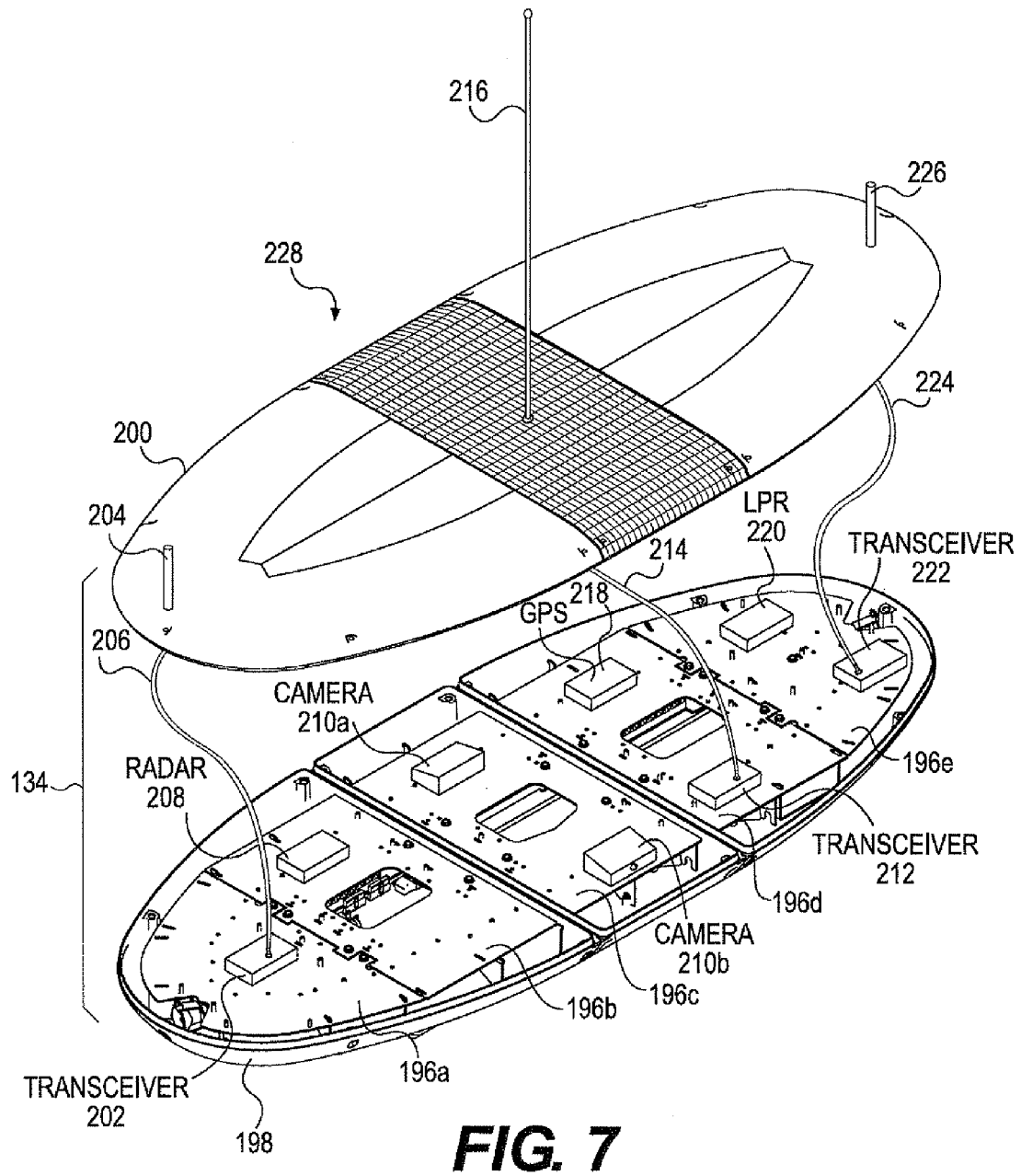
FIG. 7 illustrates an embodiment of the light bar in FIGS. 1-6 with the top half of the light bar's housing exploded away to reveal an interior space of the light bar populated with various electronic modules and antennas supported on circuit boards in keeping with the illustration in FIG. 6B.
Figure 8:
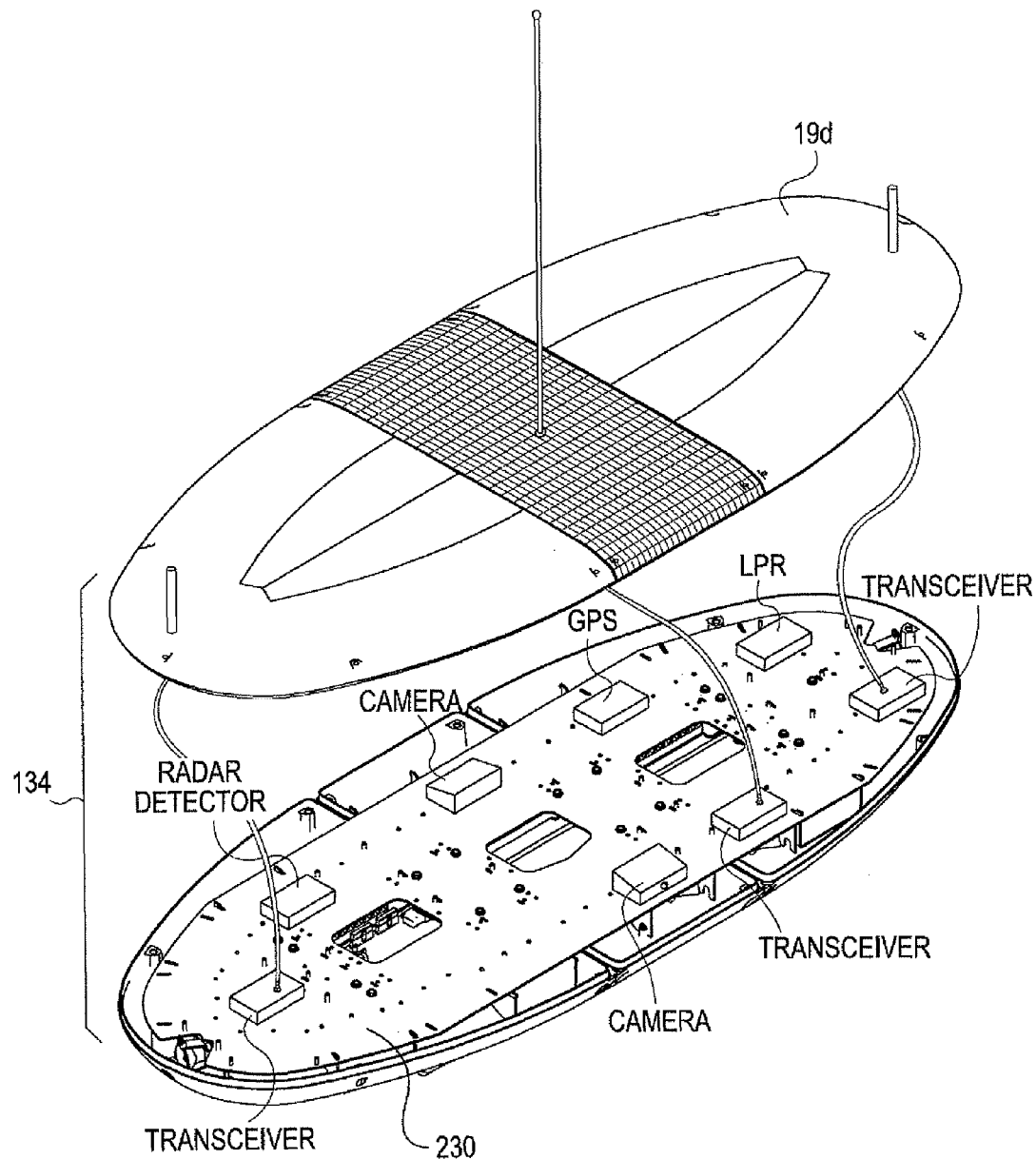
FIG. 8 illustrates an alternative embodiment of the light bar in FIGS. 1-6 with the top half of the light bar's housing exploded away as in FIG. 7 to reveal an interior space of the light bar populated with various electronic modules and antennas supported on a single monolithic circuit board.

FIG. 4 depicts a lower portion of the light bar 134 whose top half is best seen in FIGS. 7 and 8. From the controller 160 in FIG. 4, the operation of the light bar modules are directly controlled in accordance with signals generated at the control head 150 or MDT 164. Installers of the light bar 134 typically strategically place cables 154 and 162 (FIG. 2A) within the interior of the vehicle 138 so they are the least conspicuous and require the least modification of the standard interior features. In this regard, serial connections among the control head 150, the control unit 152 and the controller 160 in the light bar 134 minimizes the number of wires comprising the cables 154 and 162. Each of the two cables 154 and 162 includes two data-carrying wires for bi-directional serial communications. Separate cabling from a battery 146 carries power and reference ground wires to the control units 152 and 160, which in turn deliver the power to the modules in the light bar 134. In an alternative embodiment illustrated in FIG. 2B, the control signals are electromagnetic signals that propagate through the air so that the cables are not needed for controlling the light bar 134. In a further alternative embodiment also illustrated in FIG. 2B, the cables 154 and 162 are entirely eliminated by providing one or more power sources in and/or on the light bar 134.

In the illustrated embodiment, the controller 160 is mounted to the lower housing of the light bar 134. However, the controller 160 can be placed anywhere within or near the light bar 134. The electrical connection between the controller 160 and the modules is described hereinafter in connection with the illustration of FIG. 10. Looking at the lower portion of the light bat 134 depicted in FIG. 4, a channel 162 receives a fuel cell 165 for providing power to the modules 110-132 and warning lights (e.g., light emitting diodes, strobes and/or halogens) housed within the light bar. With both the fuel cell 165 and a wireless connection between the light bar 134 and the MDT 164, the light bar is mounted to the vehicle 138 without the need to run any wiring 148, 162 and 154 through the vehicle. Thus, the light bar 134 is easily installed on the roof 136 and the MDT 164 is easily installed in the interior of the vehicle 138.

Various known fastening systems may be used to secure the light bar to the roof 136 of the vehicle 138. For example, Federal Signal Corporation's U.S. Pat. No. 6,966,682 provides one exemplary means of attaching the light bar 134 to the vehicle 138. U.S. Pat. No. 6,966,682 is hereby incorporated by reference in its entirety and for everything that it describes. The MDT 164 can be powered by the battery 146 or it can operate from power provided by a fuel cell or solar panels.

Figure 5:
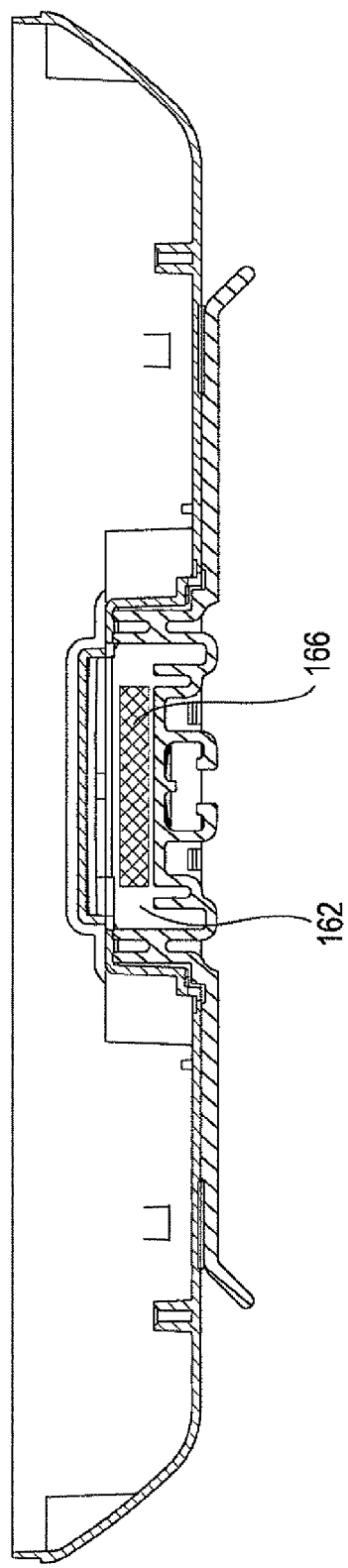
FIG. 5 is a sectional view of the lower portion of the light bar taken along line 3a-3a in FIG. 4

The channel 162 containing the fuel cell 166 can better be seen in FIG. 5, which is a cross sectional view of FIG. 4 taken along the 3a-3a. The fuel cell 166 produces electricity from a fuel supply and oxygen. A typical fuel cell uses hydrogen and oxygen as reactants on the anode side and cathode side, although other fuels may be used. Suitable fuel cells are commercially available from a number of companies such as Adaptive Materials, Inc. of Ann Arbor Mich. and CellTech Power LLC of Westborough Mass. In addition to or as an alternative to fuel cells, channel 162 can house batteries for internally powering the light bar lights and modules 110-132.

Figure 6A:
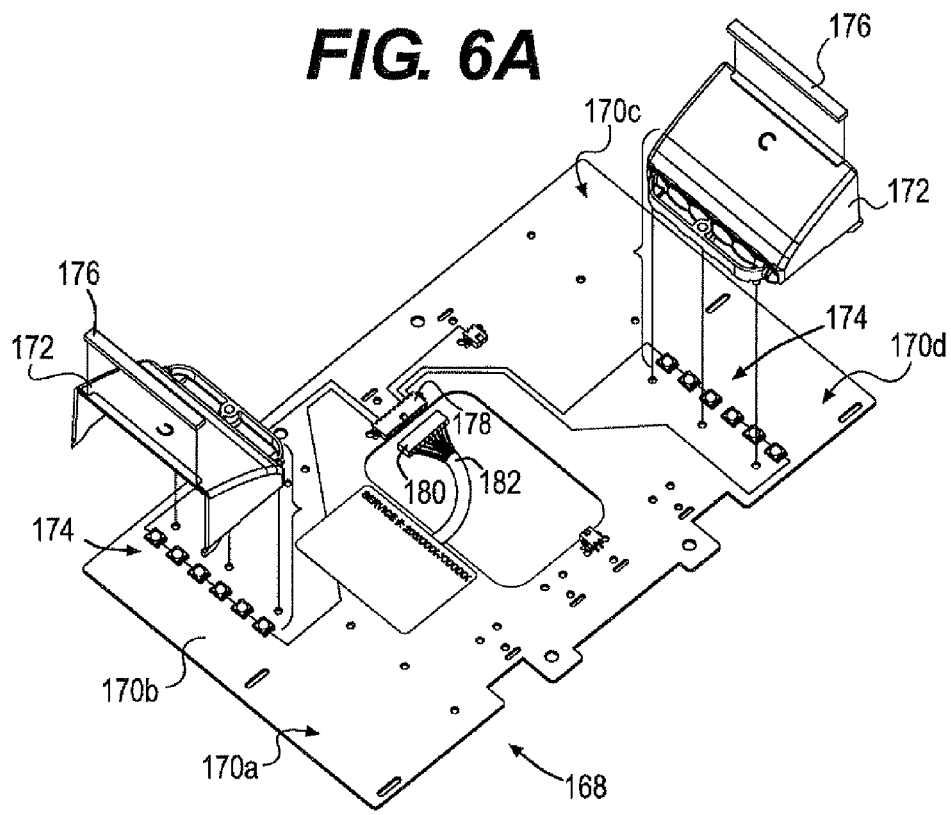
FIG. 6A illustrates one of several circuit boards in the light bar fitted with warning light assemblies.
Figure 6B:
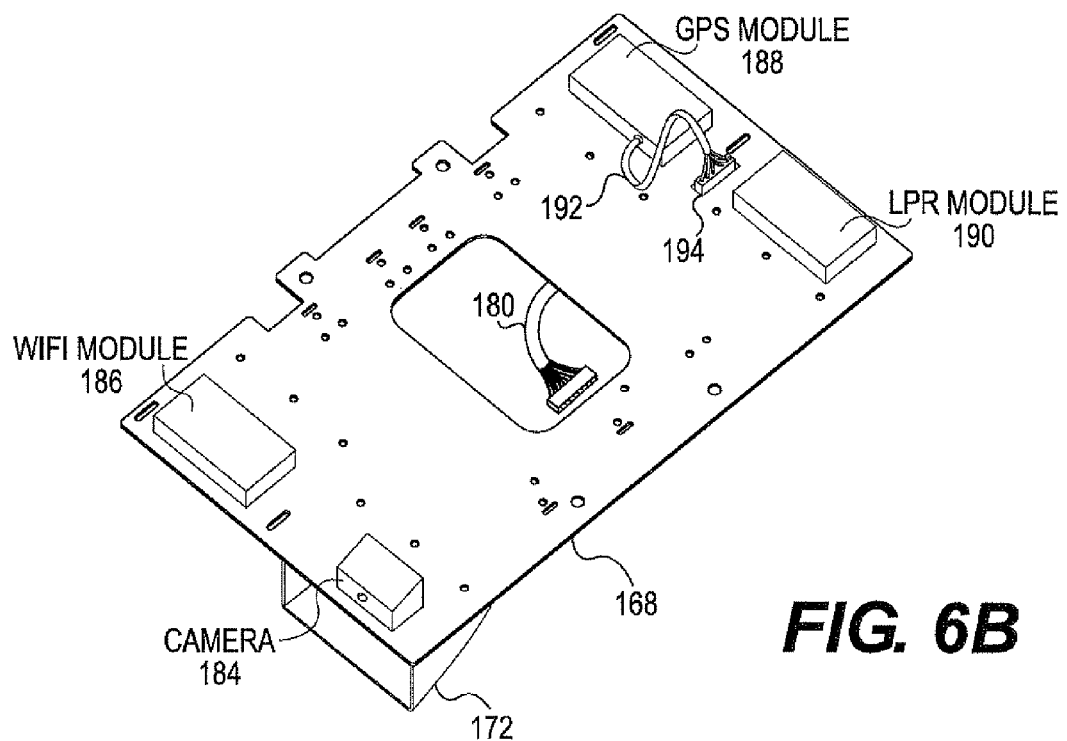
FIG. 6B illustrates the opposite side of the circuit board in FIG. 6A, showing various modules mounted on the circuit board in keeping with one embodiment of the invention.

In one embodiment of the light bar 134, several, large area circuit boards provide the platform support for the warning lights in the light bar. One of the circuit boards 168 is depicted in FIG. 6A and FIG. 6B. Preferably, the circuit board is composed of a composition that maintains its structural and electrical integrity over the ambient conditions of the light bar 134. In this regard, the light bar 134 is directly exposed to weather conditions in the area it is placed in service, which can include both hot and cold weather extremes. Also, some of the types of the light beam assemblies and modules 110-132 have attributes that may impose additional requirements on the circuit board. For example, some light beam assemblies produce significant amounts of heat, making the heat sinking capacity of the circuit board an important characteristic. Specifically, light emitting diodes (LEDs) require adequate heat sinking support in order for the LEDs to operate at their greatest efficiency. In addition, some of the modules contain sensitive electronics, which require environments relatively. free of electromagnetic interference such as the electromagnetic spray generated by the light modules, power source and other modules in the light bar 134. In addition, the printed circuit board is a structural component in the light bar assembly in that it provides a platform for supporting the modules in addition to the warning light assemblies.

Given the foregoing considerations and requirements, suitable circuit boards for the invention presently available include but are not limited to the following: Fiberglass, phenolic, aluminum (e.g., Berquist boards), steel and ceramic printed circuit board materials. Regardless of the specific composition, the boards need to be structurally robust to environmental conditions that include temperature cycling over an expected wide range that the light bar will be exposed to wherever it is operating. Some specific examples of aluminum products and sources of suitable boards are ELPOR™ by ECA Electronics of Leavenworth, Kans. and Anotherm™ of TT Electronics PLC of Clive House 12-18, Queens Road, Weybridge Surrey KT13 9XB, England. Moreover, conventional fiberglass-based circuit boards may also provide a basic build block for a suitable board. Multi-layered fiberglass boards by M-Wave™ of Bensenville, Ill. can provide the necessary structural strength and they can be fabricated to have the desired thermal properties by incorporating large ground and power planes into the board and multiple "pass throughs" or "vias."

Turning to FIG. 6A, an exemplary embodiment of a circuit board 168 in keeping with the invention includes four areas or stations 170a, 170b, 170c and 170d for fastening light beam assemblies 172 to the board 168. Each of the areas 170a-170d includes connections for various light beam assemblies 172 illustrated in FIG. 6A. One skilled in the art of emergency lighting will recognize that many types of warning light assemblies can be installed on the circuit board. Appropriate examples include, but are not limited to light emitting diodes ("LEDs") and halogen warning light assemblies. Further, the assemblies can be in a fixed orientation or may be capable of oscillating. The warning light assemblies in FIG. 6A include six (6) LEDs collectively identified as 174 and a reflector 176.

The LEDs 174 are laid down on the circuit board 168 as part of the board's fabrication process. In this regard, the circuit board 168 includes conductive paths leading from a connector 178 mounted along an edge of an opening in the board. As discussed in further detail hereinafter, the connector 178 mates with a connector 180 of a cable 182 that has an opposing end connected to the controller 160. The cable 182 carries power and control signals to the board 168. Electrical lead lines in the circuit board 168 carry power and control signals to the electronic components (e.g., drivers) and LEDs 174 and to all other types of light assemblies and modules on the circuit board 168.

FIG. 6B illustrates the opposite or second side of board 168 shown in FIG. 6A. Light assembly 172 is visible on the bottom of the board 168. The illustrated embodiment depicts four modules mounted on the board. The video camera 184 provides video surveillance of an area near the light bar 134. For example, the video camera may be an Axis 211 network camera by Axis Communications AB, Emdalavägen 14, SE-223 69, Lund, Sweden. The Wi-Fi transceiver 186 provides wireless network connectivity to IEEE 802.11 compatible networks. An example of the Wi-Fi transceiver is a HotPort 3100/PS, which is a multi-spectrum transceiver capable of operating in the IEEE 802.11 2.4 GHz and 5.0 GHz bands and in the 4.9 GHz public safety band. The HotPort 3100/PS is a wireless mesh network node suitable for broadband data, video, and voice (VoIP) communication. The HotPort 3100/PS is available from Firetide, Inc., 16795 Lark Ave., Suite 200, Los Gatos, Calif. 95032. Appropriate network configurations will be discussed hereinafter with reference to FIG. 10. The OPS unit 188 provides the location of the emergency device 102 as currently depicted in a light bar 134. Appropriate GPS units are available from One Track, Inc. of Phoenix, Ariz. The LPR unit 190 provides the license plate numbers of nearby vehicles. An example of appropriate LPR unit 190 is AutoFind available from Autovu Technologies, Inc. of Montreal, Quebec.

A wide variety of modules can be mounted on the board 168 in various configurations in order to perform monitoring and response activities. The cable 180 provides control signals, data signals and power from the controller 160 for the modules 184-190. Each of the modules 184-190 can be soldered directly to the board 168, or may be fitted with a plug that is received by a socket on the board. By constructing the modules and circuit board 168 with a plug and socket arrangement, the combinations of modules in the light bar 134 are variable and amenable to customization to fit any desired configuration. In fact, for a fully integrated light bar 134 in which the power supply is contained in the light bar, any combination of modules can be easily and quickly placed into the circuit board 168 and the light bar attached to a vehicle so as to provide a light bar that best serves the requirements of a particular emergency condition requiring the vehicle to be retrofitted and put into emergency service.

The electrical connections from a module to the board 168 may be made through the socket, by direct connection or through use of a cable. For example the Wi-Fi module 186 is depicted with a direct connection to the board 168. In contrast, the GPS module 188 is depicted connecting to the board 168 via a cable 192 connected to a plug 194 on the circuit board. In general, each of the modules can use any appropriate connection method of connecting to the board. Additionally, modules do not have to be mounted to a board 168 at all, but may be mounted directly to the light bar 134. Finally, the emergency device 102, comprising various modules 110-132, does not have to take the form of a light bar. For example, the emergency device 102 may be built into a body of a vehicle designed for emergency services such as fire trucks and ambulances. The device may be in an undercover police vehicle. Other public service vehicles such as street sweepers may also incorporate the emergency device 102. Still further, the device can be integrated in to stationary platforms such as emergency sirens mounted to poles distributed through a community. The devices may also be equipped with portable platforms that allow the devices to be deployed as needed for any special circumstances.

In the fully populated light bar 134 depicted in FIG. 7, the lower housing 198 of the light bar houses five (5) circuit boards 196a, 196b, 196c, 196d and 196e of the type illustrated in FIGS. 6A and 6B. The upper housing 200 is exploded away from the lower housing 198 in order to show the circuit boards mounted to the interior of the light bar 134. The light assemblies 172 are mounted on the underside of the circuit boards 196a-196e and are thus in the lower housing of the light bar. The transceiver module 202 mounted on circuit board 196a provides wireless communications with a network such as a Wi-Fi network typically running at 2.4 GHz or 5 GHz. The transceiver 202 connects with antenna 204 thru cable 206 in order to broadcast and receive messages. In the illustrated embodiment, the antenna 204 is mounted to the housing of the light bar. However, the antenna 204 may alternatively be mounted to the circuit board and either fully enclosed within the housing or extending through a hole in the housing that includes a water tight seal. The radar module 208 provides the speed of nearby vehicles. Camera modules 210a and 210b provide video surveillance facing the front and rear of the light bar 134. A second transceiver 212 acts as the land mobile radio (LMR). Cable 214 connects the transceiver 212 with the antenna 216. GPS module 218 provides location information. LPR 220 provides the license plate number of nearby vehicles. Transceiver 222 connects to the public safety network, typically running at 4.9 GHz. The cable 224 connects the transceiver 222 to its associated antenna 226. Each of the modules connects to its associated circuit board thru either a direct connection or a cable 192. The circuit boards may connect directly to one another or may connect to the controller 160 thru use of a cable 180. Any number or combination of modules may be utilized by embodiments of the light bar 134, depending on expected uses of the emergency device 102. Further, the modules depicted in FIG. 7 can be oriented in a variety of ways within the light bar 134 and the particular layout depicted in the figure represents only one embodiment. Referring to FIG. 8, in an alternative embodiment of the light bar 134 the circuit boards 196a-196e in the embodiment of FIG. 7 are replaced with a single board 230. The circuit board 230 in FIG. 8 provides similar functionality to the circuit boards 196a-196e in FIG. 7. Like the multiple boards of the embodiment in FIG. 7, the ground plane of the board 230 separates the interior space of the light bar into top and bottom sections. The electromagnetically noisy warning lights are contained in the bottom section of the light bar and substantially electromagnetically isolated by the ground plane from the sensitive modules mounted on the top surface of the board facing the top section of the interior space of the light bar.

In yet another embodiment of the light bar 134, the upper housing 200 includes a solar panel 228 for providing power to the electrical device in the light bar. The solar panel 228 can be integrated into the upper housing 200 or separately attached to the housing. The solar panel 228 directly provides power to the light bar 134 or alternatively it works in conjunction with the fuel cell 165. In one embodiment, the solar panel powers electrolyzers for hydrogen production. The hydrogen is then used as a fuel for the fuel cell 165. Power sources for the light bar 134 will be more fully described with respect to FIG. 10 hereinafter.

Electromagnetic interference ("EMI") is caused by changes to electrical signals. EMI can induce unwanted electrical signals in other circuits, which are commonly referred to as noise. Rapidly changing signals produce EMI in frequency regions that potentially are in the same frequency domain as desired communications and data signals. Additionally, higher power signals produce stronger EMI. Physically moving sensitive circuitry away from sources of EMI tends to mitigate the effect of the EMI on the circuitry. However, with the electrical modules integrated into the light bar 134, these circuits do not benefit from the attenuation of the EMI brought about by the physically distance from the EMI source. Warning lights quickly turning on and off, electric motors and high power requirements all contribute to EMI. Sensitive electronics do not operate efficiently in the presence of EMI. For example, digital clock speeds must be reduced in order to ensure proper operation of circuits. Transceivers loose both data range and data rate because of EMI.

Figure 9A:
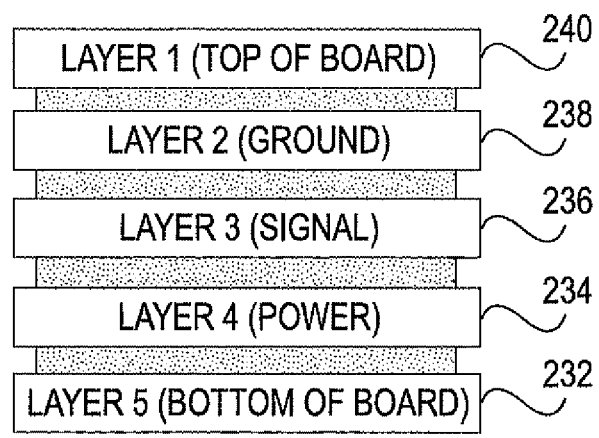
FIG. 9A illustrates a cross sectional view of a circuit board suitable for use as the circuit board in FIGS. 7 and 8 whose ground plane when placed in the light bar creates an area within the light bar that is relatively free of stray electromagnetic radiation from the operation of the warning lights.
Figure 9B:
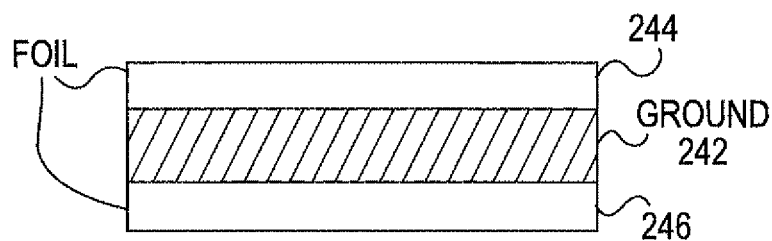
FIG. 9B illustrates a cross sectional view of an alternative circuit board also suitable for use as the circuit board in FIGS. 7 and 8 whose ground plane when placed in the light bar creates an area within the light bar that is relatively free of stray electromagnetic radiation from the operation of the warning lights.
Figure 9C:
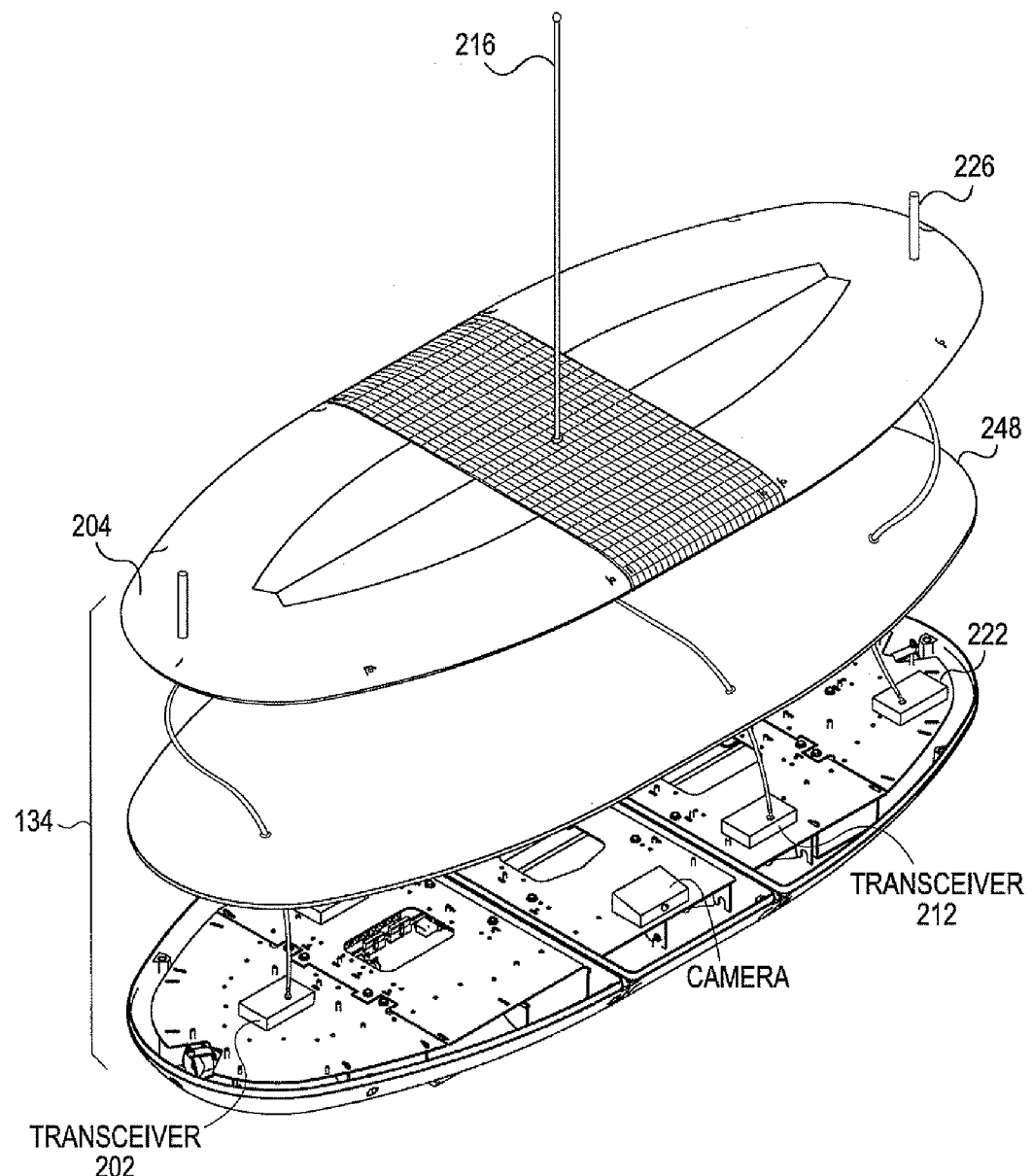
FIG. 9C illustrates an embodiment of the light bar in FIGS. 1-6 where a grounding plane within a light bar and separate from the circuit board(s) for supporting the warning lights provides isolation from the electromagnetic spray of the warning lights.

FIG. 9A, FIG. 9B and FIG. 9C show appropriate methods of minimizing EMI within the light bar 134. FIGS. 9A-9C illustrate three alternative shielding methods for creating an electromagnetically quite area in the top section of the light bar, which is hospitable to the electronic modules. FIGS. 9A and 9B illustrate ground planes in circuit boards that function to create an upper section. of the light bar 134 that is substantially isolated from the EMI generated from the warning lights in the bottom section. The circuit boards can be made with various materials. One common material is Flame Resistant 4 ("FR-4"). FR-4 is a fiberglass material with a resin epoxy. FIGS. 9A and 9B show the construction of two alternative boards for the light bar 134 illustrated in FIGS. 1-8.

The board in FIG. 9A is made of FR-4 material, but other board materials may be used. In the illustrated board of FIG. 9A, there are five (5) layers with layer 5 representing the bottom of the board on which the warning light assemblies 172 and LEDs 174 are mounted, Any additional components needed by the light assemblies and LEDs, such as resisters and capacitors and the necessary board traces are on layer 5. Layer 4 contains the power plain. The power plane can contain both digital and analog islands as needed to minimize noise. Layer 3 is the signal plane. The signal plane is isolated from the warning light assemblies 172 by the power plane 234. Further, the signal plane is isolated from the modules 110-132 mounted on the top of the board by the ground plane in layer 2. Thus, inherently sensitive, high-speed signals can be routed on layer 3 and shielded from noisy components on the top and bottom of the board. Layer 1 is the top of the board where the modules 110-132 are mounted. Many of the modules require a relative quiet EMI environment. For example, EMI can result in the radar unit 110 returning incorrect speeds for passing vehicles. The video recorder 120 may not record a clean image if excessive EMI is present. Finally, the transceivers 124, 128 and 130 need a quiet EMI environment to maximize both their range and data rate. The ground plane in layer 2 238 provides necessary isolation for the modules 110-132 without the need to additional shielding.

FIG. 9B represents the cross sectional view of a board made of Anotherm™ by TT Electronics PLC. The board material 242 acts as a natural ground plane. Therefore, the modules 110-132 mounted on the top of the board 244 are isolated from the light assemblies 172 mounted on the bottom of the board 246.

FIG. 9C illustrates an additional or alternative grounded shielding plane 248 for the modules, particularly antennas 204, 216 and 226 connected to the transceivers 202, 212 and 222. The grounded shielding plane 248 may be required as additional grounding for the antennas depending on the specific configuration of warning light assemblies 172 and modules 110-132. The ground plane 248 should be a made of a conductive material and for the best isolation, the plane should substantially cover the surface of the circuit boards 196a-196e. Other methods of minimizing interference due to EMI can be utilized. For example, electrical filtering such as high/low pass filters may be added. The modules most sensitive to EMI may be housed or wrapped in grounded shielding. The most sensitive electronic devices can also be physically located as far apart as possible from the noisiest sources of EMI.

Figure 10:
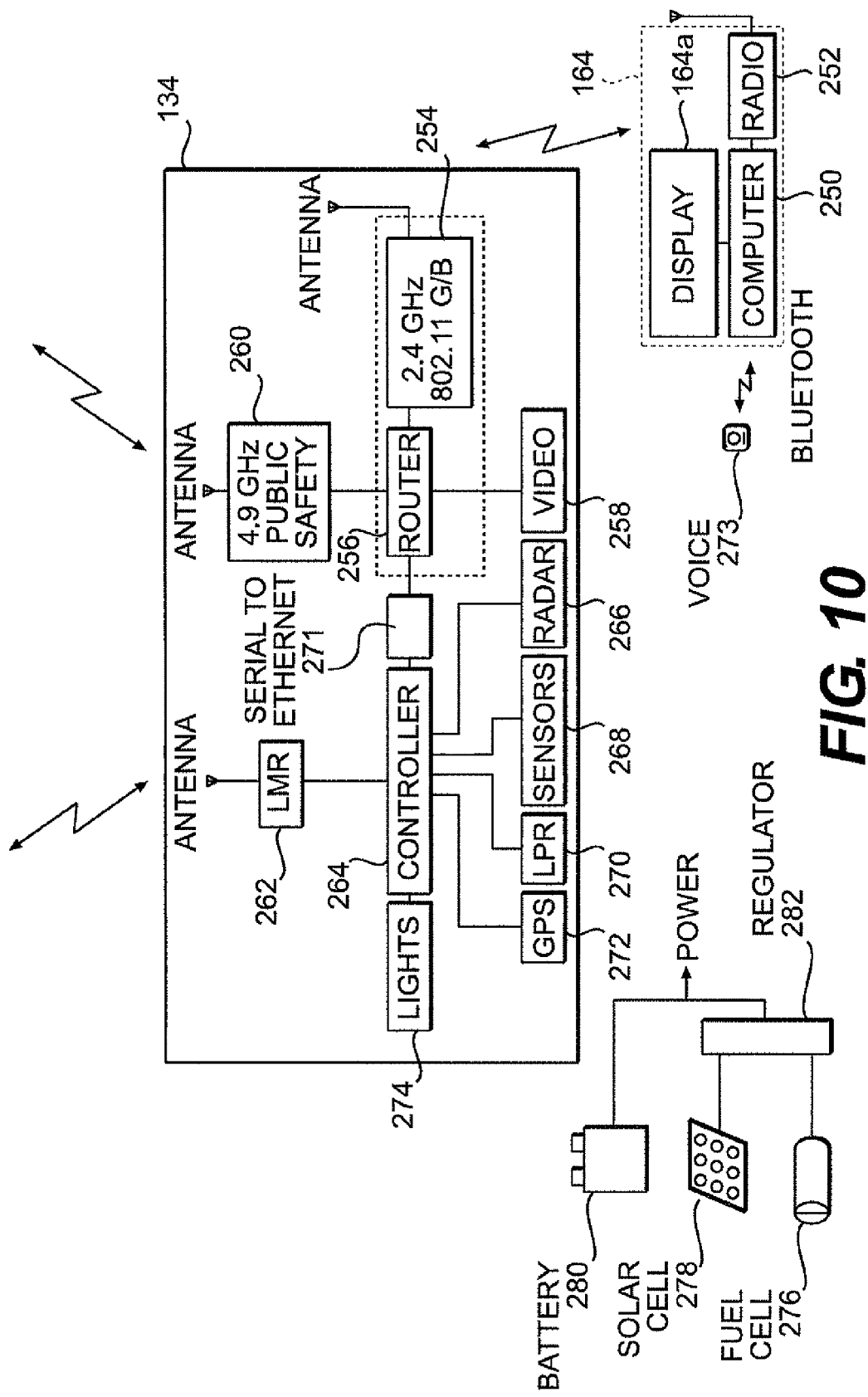
FIG. 10 is a schematic diagram of the electronic modules in one embodiment of the light bar.

FIG. 10 is a schematic diagram of the circuitry in the light bar 134, the MDT 164 and power sources for both. In the illustration, the MDT 164 accepts signals via a Bluetooth IEEE 802.15 network. In one embodiment of the light bar, the signals include voice commands and voice messages broadcast over a network. Data broadcast over the network may be broadcast over the LMR 262 or either of the transceivers 254 and 260. A variety of companies including Motorola and Nokia make appropriate Bluetooth headsets 273. A user wears a hands free headset 273 so that commands are issued without distracting from the user's other duties and activities.

The MDT 164 includes a display 164a. Preferably, the display is a touch screen as discussed above in connection with FIG. 3 so that the user can enter commands by simply touching the screen. However, other types of displays can be substituted for the touch screen or may complement it. For example, a conventional liquid crystal display can be used as the display 164a. A computer 250 controls the display 164a, provides a keyboard for entering commands and receives commands and voice messages from the Bluetooth headset 273. The computer 250 transmits commands and receives messages from the emergency device 102 in the light bar 134. In one embodiment of the light bar 134, the computer 250 uses a transceiver 252 compliant with the IEEE 802.11 specification for transmitting data to the light bar 134 over a Wi-Fi network. In one embodiment of the invention, the display 164a, computer 250 and radio 252 are integrated into a single laptop computer acting as the MDT 164 as illustrated in FIGS. 1 and 2B.

The light bar 134 receives commands from the MDT 164 over a Wi-Fi network. The transceiver 254 connects to a router 256, which forwards data packets from the transceiver 254 across the network. The router 256 is of conventional design and may be any of several commercially available models. For example, the MDT 164 issues a command for the video camera 258 to begin recording. The command is transmitted to the light bar 134 and received by the transceiver 254. The transceiver sends the data to the router. The video camera 258 has an Ethernet port conforming to the IEEE 802.3 protocol. The camera 258 connects directly to the Ethernet router 256 using a standard Ethernet cable. The router thereby forwards the command issued by the MDT 164 to the camera 258. In response to the command, the camera 258 begins recording. Additionally, the camera 258 sends the video signal to the MDT 164 via the router 256 and the transceiver 254. The MDT 164 displays the live video feed on the display 164a. Other devices with an Ethernet port, such as the public safety radio 260 connect directly to the router. In one embodiment of the light bar 134, all modules contain an Ethernet port for direct connection to the router 256.

Devices without an Ethernet port connect to a controller 264. The controller 264 interfaces with each module and a serial to Ethernet converter 271, which provides an interface between the controller and the router 256. The converter 271 translates data packets forwarded by the router 256 and then the controller 264 sends commands to each of the connected modules, which include in the illustrated embodiment the radar unit 266, biological and chemical sensors 268, the LPR 270 and the GPS 272. The controller 264 also interfaces with the warning light assemblies 274. For example, a user turns on the lights by way of commands entered at the MDT 164. The MDT sends the command over the Wi-Fi network to the transceiver 254. The transceiver forwards the data to the router 256 and the router forwards the data packet to the converter 271, which in turn provides serial commands to the controller 264. The controller 264 interprets the serial commands and turns on the lights 274. Similarly, a user controls the GPS 272, LPR 270, sensors 268 and radar 266 from the MDT 164. Likewise, modules send data to the MDT 164. For example, the radar 266 detects the speed of nearby vehicles. The radar sends the speed data to the controller 264, which outputs a serial data stream to the converter 271. The converter 271 formats the speed data as an Ethernet data packet and sends the packet to the router 256. The router forwards the packet the transceiver 254 where it is sent over the Wi-Fi network to the MDT 164. The MDT formats and displays the speed. A user thereby receives real time information on the speeds of nearby vehicles.

The controller 264 also interfaces with the land mobile radio (LMR) 262. Voice and data messages from either the light bar or the MDT are sent over the LMR 262 or the public safety radio 260. Additional transceivers are added to the system for connecting to additional networks, such as a cellular telephone network or a community Wi-Fi mesh network among others. Additional modules may be housed in the light bar 134 and modules may be removed from the light bar 134 as necessary for a given expected emergency. By way of example, controller 264 may be a Terra3 Intelligent RTU (Remote Terminal Unit) from Federal Signal Corporation, University Park, Ill. The converter 271 may be a TS900 Series serial to Ethernet converter by EtherWAN Systems, Inc., Via Rodeo, Placentia, Calif. 92870.

In one embodiment of the light bar 134, a power source is integrated into the bar. The integrated power source may include a fuel cell 276, a solar panel 278 and a battery 280. In the schematic diagram of FIG. 10, the fuel cell 276 and solar cell 278 each feed a regulator 282. The regulator maintains a constant voltage to the light bar 134. The solar cell 278 charges the battery 280 so that the light bar can keep operating in dim light and at night.

Figure 11A:
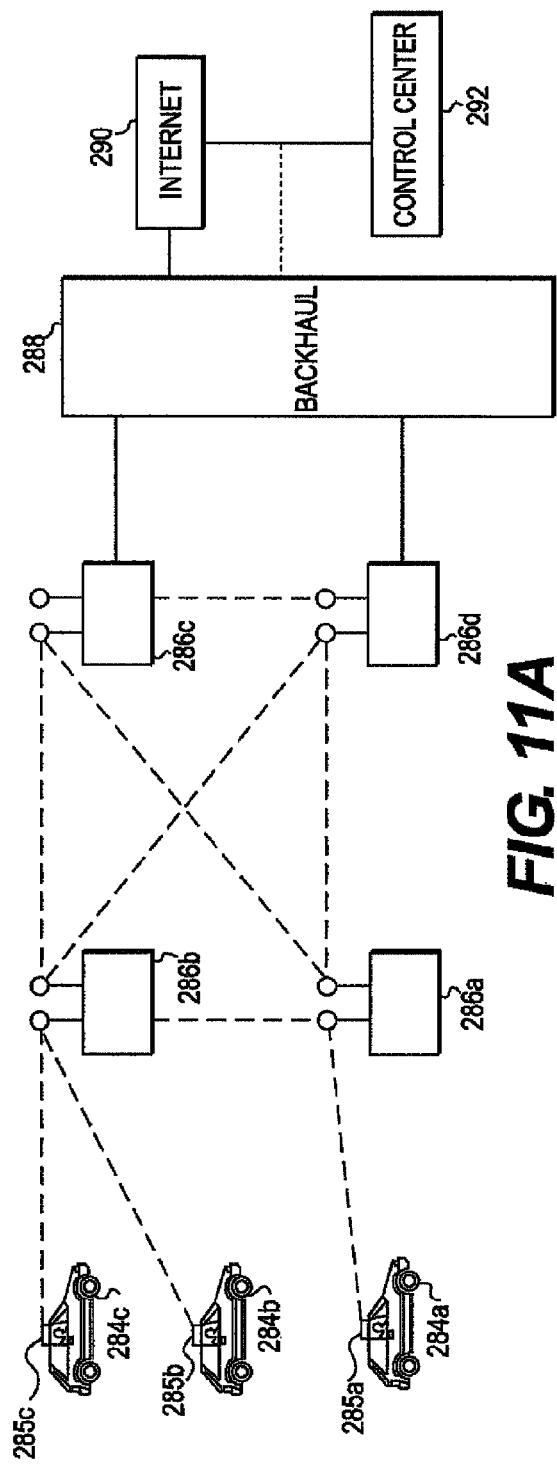
FIG. 11A is a schematic illustration of a wireless wide area network including a wireless mesh network connecting fully integrated light bars such as those illustrated in FIGS. 1-10 to a control center.

FIG. 11A depicts a community Wi-Fi mesh network for use by one embodiment of the light bar 134. Towers 286a, 286b, 206c and 286d act as nodes within the mesh network, routing data as needed among themselves and to the back haul system 288 for connection to the Internet 290. Various devices with Wi-Fi capabilities can connect wirelessly to the mesh network thru the towers 286. Vehicles 284a, 284b and 284c are each equipped with a light bar 285a, 285b and 285c, respectively, as described above and illustrated in FIGS. 1-10. Each of the light bars connects to the Wi-Fi mesh network using an 802.11 compliant transceiver in the light bar 285. Using the MDTs in the vehicles 284, occupants of the vehicles send data to the control center 292. In one embodiment, vehicle 284a records live video with a video module in light bar 285a. The occupant of vehicle 284a sends the live video feed over the Wi-Fi network using a transceiver in the light bar 285a. The transceiver connects to tower 286a and the video feed is forwarded to the back haul system 288. The back haul delivers the video feed to the control center 292 either directly or via the internet 290 as indicated in FIG. 11A. The co-pending U.S. patent application Ser. No. 11/505,642, filed Aug. 17, 2006 and entitled "Integrated Municipal Management Console" depicts one embodiment of the control center. In keeping with the description in co-pending U.S. patent application Ser. No. 11/505,642, personnel in the control center 292 view the live video feed from vehicle 284a and alert or marshal resources as needed. Alternatively, the control center can enable the camera in the light bar 285a remotely. U.S. patent application Ser. No. 11/505,642 is hereby incorporated by reference in its entirety and for everything that it describes.

In another embodiment of the system supporting the light bar, a video feed from light bar 285a is sent to the MDT in vehicle 284b. In a first embodiment the video feed is sent from light bar 285a to the control center 292. The control center 292 then forwards the video feed over the internet 290, back haul 288 and nodes 286 to the light bar 285b. Light bar 285b transmits the live video feed from 285a to the MDT in vehicle 284b. The occupant of vehicle 284b can therefore see a live image of the video feed taken by light bar 285a. In yet another embodiment of the system supporting the light bar, the live video feed is sent directly from light bar 285a over the Wi-Fi mesh network to light bar 285b. The video feed is then sent to the MDT in vehicle 284b where the occupant of the vehicle views it. Any data from a module can be sent over the network to the control center or to other vehicles. Voice messages using VoI. or traditional voice networks can also be sent from a vehicle to the control center and from the control center to a vehicle or from a first vehicle directly to a second vehicle. Further, the control center can send any appropriate data for display on the MDT or for announcement by a vehicle's built in speakers or through a user's Bluetooth headset.

Figure 11B:
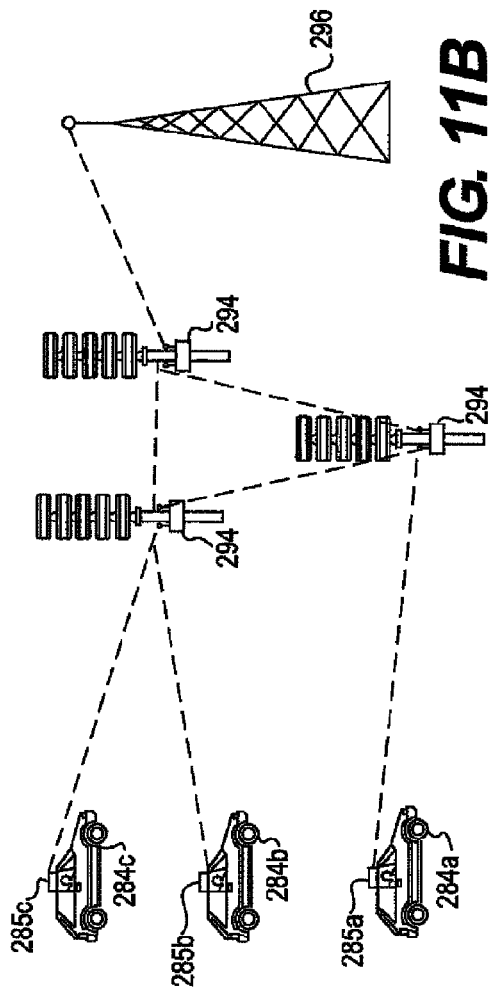
FIG. 11B is a schematic illustration of a wireless wide area network including a wireless mesh network and a wireless point to multipoint network connecting fully integrated light bars such as those illustrated in FIGS. 1-10 to a control center.
Figure 11C:
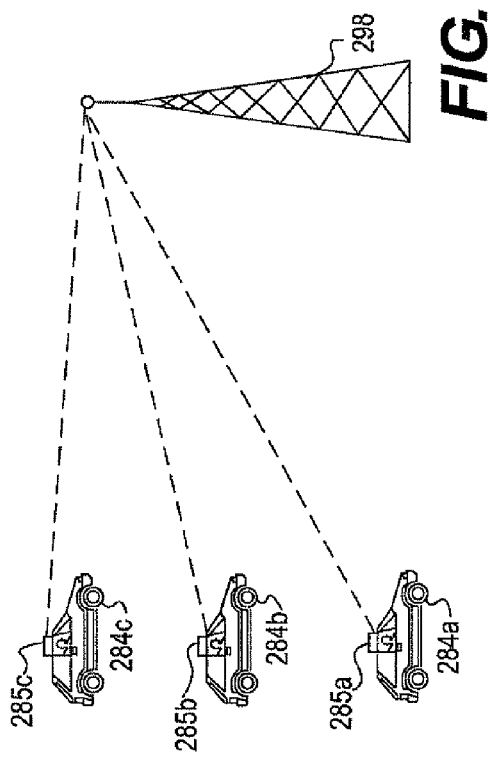
FIG. 11C is a schematic illustration of a wireless wide area network including a point to multipoint network connecting fully integrated light bars such as those illustrated in FIGS. 1-10 to a control center.
Figure 11D:
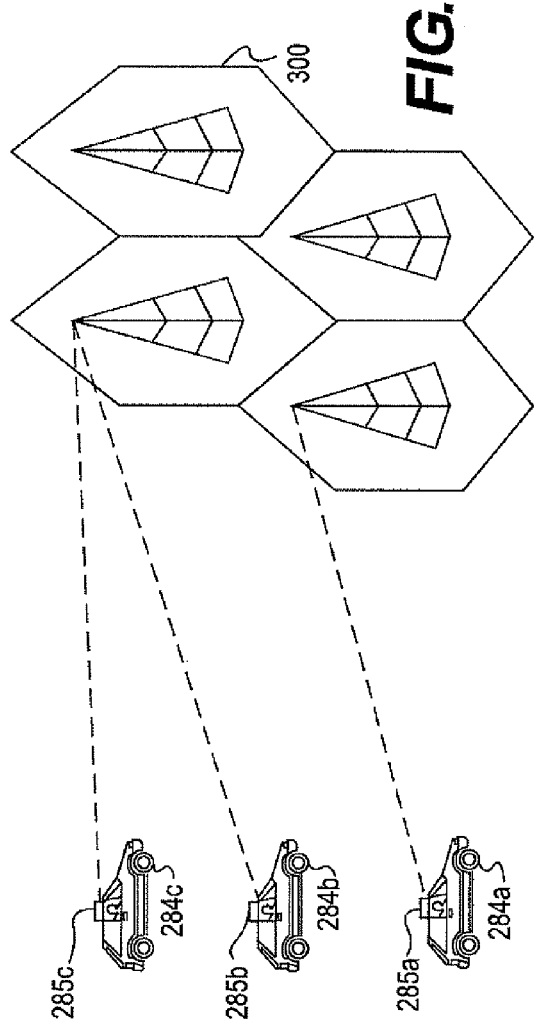
FIG. 11D is a schematic illustration of a wireless wide area network including a cellular network connecting fully integrated light bars such as those illustrated in FIGS. 1-10 to a control center.

In one embodiment of the invention depicted in FIG. 11B, outdoor warning sirens 294 act as nodes in a Wi-Fi mesh network allowing vehicles 284a, 284b and 284c to connect to the network. The outdoor warning sirens 294 connect to a tower 296. The tower 296 provides further access to the back haul, internet or other appropriate network for connecting to a control center. In keeping with one embodiment of the invention, FIG. 101C depicts a point to multipoint network with vehicles 284a, 284b and 284c connecting directly to tower 298 that provides access thru an appropriate network connection to a control center. In another embodiment of the invention, depicted in FIG. 11D, vehicles 284a, 284b and 284c connect to a cellular network 300. The cellular network 300 provides access to a control center. FIGS. 11A, 11B, 11C and 11D illustrate possible network protocols and configurations. Embodiments of the invention utilize any appropriate wireless network protocols and network configurations for connecting emergency device 102 to a control center.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the light bar and its network environment (especially in the context of the following claims) are to be construed to cover both the singular and the plural, unless otherwise indicated herein or clearly contradicted by context. The terms "comprising," "having," "including," and "containing" are to be construed ash open-ended terms (i.e., meaning "including, but not limited to,") unless otherwise noted. All methods described herein can be performed in any suitable order unless otherwise indicated herein or otherwise clearly contradicted by context. The use of any and all examples, or exemplary language (e.g., "such as") provided herein, is intended merely to better illuminate the various embodiments of the light bar and does not pose a limitation on the scope of the invention unless otherwise claimed. No language in this description should be construed as indicating any non-claimed element as essential to the practice of the invention.

Preferred embodiments of the light bar and the system supporting it are described herein, including any best mode known to the inventor. Variations of those preferred embodiments may become apparent upon reading the foregoing description. The inventor expects skilled artisans to employ such variations as appropriate, and the inventor intends for the fully integrated light bar and its supporting network system to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A system comprising:
a light bar for mounting to a first responder vehicle, wherein the light bar includes in a single common housing, each of (1) a warning device for broadcasting at least one of visual and audio emergency signals to an area external to the first responder vehicle in response to an emergency condition, (2) at least two transceivers in wireless communication with one or more public safety networks, (3) at least one device connected to one or more of the at least two transceivers for transmitting information over at least one of the one or more public safety networks related to the emergency condition, and (4) a power source integrated into the light bar that comprises one or more of a fuel cell, a solar panel, and a battery, (5) a grounded shielding plane that reduces electromagnetic interference between the at least two transceivers and at least one other device included in the single common housing of the light bar, wherein the information includes information other than voice communications that inform a recipient of real time conditions of the first responder vehicle, its operator of the vehicle, and the ambient environment of the vehicle and the operator of the vehicle; and
a control device mounted in an interior of the first responder vehicle separate from the light bar and in communication with the at least two transceivers, wherein the control device controls operation of the warning device by the vehicle operator such that the warning device toggles between off and on conditions in response to operator input, wherein all of the on conditions of the warning device result in the warning device broadcasting warning or emergency signals.

2. The system of claim 1 wherein the information comprises data packets, each packet comprising address and data fields.

3. The system of claim 1 wherein the one or more public safety networks are at least one of a Wi-Fi network, a WiMax network, and a cellular network.

4. The system of claim 1 including a wireless communications link between at least one transceiver and the control device.

5. The system of claim 4 wherein the wireless communication link is one of a Wi-Fi network, a Bluetooth network, a Zigbee network and a wireless USB network.

6. The system of claim 1 wherein the at least one device connected to one or more of the at least two transceivers is one of a camera, a radar detector, a chemical agent detector, a biological agent detector, a license plate recognition system and a global positioning system.

7. The system of claim 1 wherein the control device includes an interface for receiving the information from the light bar.

8. The system of claim 7 wherein the control device includes a display to notify occupants of the vehicle of the information.

9. The system of claim 8 wherein the display comprises a primary display through which another display is accessible for controlling said at least one device.

10. The system of claim 9 wherein the said at least one device is a video camera and said another display includes controls for the video camera.

11. A communications system comprising:
a light bar in a single common housing for mounting to a first responder vehicle, the single common housing including each of: (1) a warning device for broadcasting at least one of visual and audio emergency signals in response to an emergency condition, (2) at least two transceivers in wireless communication with one or more public safety networks, (3) at least one device connected to one or more of the at least two transceivers for transmitting information related to the emergency condition over at least one of the one or more public safety networks including information other than voice communications informing a recipient of substantially real-time information related to the emergency condition, and (4) a power source integrated into the light bar that comprises one or more of a fuel cell, a solar panel, and a battery, (5) a grounded shielding plane that reduces electromagnetic interference between the at least two transceivers and at least one other device included in the single common housing of the light bar; and a control device mounted in an interior of the first responder vehicle separate from the light bar and in communication with the at least two transceivers, wherein the control device controls operation of the warning device by a operator of the vehicle such that the warning device toggles between off and on conditions in response to vehicle operator input, wherein all of the on conditions of the warning device result in the warning device broadcasting warning or emergency signals; and a centralized management console separate from the light bar and attached to the one or more public safety networks that provides the recipient of the information transmitted from the light bar.

12. The system of claim 11 wherein the light bar houses a controller in wireless communication with the control device in a passenger compartment of the first responder vehicle.

13. The system of claim 11 wherein each transceiver is in wireless communication with a corresponding community wide network.

14. The system of claim 11 wherein the other at least one device connected to one or more of the at least two transceivers is one or more of a camera, a radar detector, a chemical agent detector, a biological agent detector, a license plate recognition system and a global positioning system.

15. The system of claim 11 wherein a first public safety network is a mesh network.

16. The system of claim 15 wherein the mesh network is one of a Wi-Fi network and a Zigbee network.

17. The system of claim 11 wherein a first network is one of a cellular network and a WiMax network.

18. The system of claim 11 wherein the information sent to the centralized management console includes data identifying the first responder vehicle.

19. The system of claim 11 wherein the first responder vehicle is a first vehicle and the centralized management console includes a transceiver for transmitting information received from the first responder vehicle to a second responder vehicle having a light bar.

20. The system of claim 11 wherein the information is transmitted to the centralized management console as one or more data packets, each packet comprising address and data fields.

21. The system of claim 11 wherein the first responder vehicle is a first responder vehicle with a first light bar including a first transceiver that transmits the information over a first public safety network to a second light bar of a second responder vehicle where the information includes data informing a recipient at the second responder vehicle of the emergency condition at the first responder vehicle.

22. A method of retrofitting a vehicle with equipment for responding to an emergency in order to convert the vehicle to a first responder vehicle, the method comprising:

providing a light bar comprising a single common housing containing the equipment that includes (1) a warning device for broadcasting from the vehicle at least one of visual and audio emergency signals in response to a detected emergency condition, (2) at least two transceivers, and (3) a source of power that comprises one or more of a fuel cell, a solar panel, and a battery for powering the warning device and the transceivers, and (4) a grounded shielding plane that reduces electromagnetic interference between the at least two transceivers and at least one other device included in the single common housing of the light bar;

mounting the light bar to the vehicle;

mounting a control device for the warning device in the first responder vehicle at a location different from a location at which the light bar is mounted;

establishing a wireless communication between the control device and the light bar;

establishing a connection between one or more of the at least two transceivers in the light bar and one or more community wide public safety networks, thereby enabling a user of the first responder vehicle to communicate to others connected to the one or more community wide public safety networks; and controlling by the control device the broadcasting of the at least one audio and visual emergency signals from the warning device such that the warning device switches between off and on conditions, wherein all of the on conditions of the warning device result in the warning device broadcasting warning or emergency signals.

23. The method of claim 22 wherein the mounting of the light bar to the vehicle includes attaching the light bar to the roof of the vehicle.

* * * * *